United States Patent
Shimoshimano et al.

(10) Patent No.: US 11,432,227 B2
(45) Date of Patent: Aug. 30, 2022

(54) MANAGEMENT DEVICE AND STORAGE MEDIUM FOR CONTROLLING COMMUNICATION WITH TERMINAL DEVICE

(71) Applicant: JVCKENWOOD Corporation, Yokohama (JP)

(72) Inventors: Hideo Shimoshimano, Yokohama (JP); Ichiro Shishido, Yokohama (JP)

(73) Assignee: JVCKENWOOD CORPORATION, Saitama (JP)

( * ) Notice: Subject to any disclaimer, the term of this patent is extended or adjusted under 35 U.S.C. 154(b) by 0 days.

(21) Appl. No.: 17/198,602

(22) Filed: Mar. 11, 2021

(65) Prior Publication Data
US 2021/0289420 A1 Sep. 16, 2021

(30) Foreign Application Priority Data

Mar. 11, 2020 (JP) .............................. JP2020-042392

(51) Int. Cl.
| | |
|---|---|
| *H04W 40/24* | (2009.01) |
| *H04W 40/20* | (2009.01) |
| *H04W 40/04* | (2009.01) |
| *H04W 4/021* | (2018.01) |
| *H04W 12/08* | (2021.01) |
| *H04W 4/029* | (2018.01) |

(52) U.S. Cl.
CPC ........... *H04W 40/24* (2013.01); *H04W 4/021* (2013.01); *H04W 4/029* (2018.02); *H04W 12/08* (2013.01); *H04W 40/04* (2013.01); *H04W 40/20* (2013.01)

(58) Field of Classification Search
CPC ..... H04W 40/04; H04W 40/20; H04W 40/24; H04W 4/021; H04W 4/029; H04W 12/08
See application file for complete search history.

(56) References Cited

U.S. PATENT DOCUMENTS

| | | | | |
|---|---|---|---|---|
| 6,980,794 B1* | 12/2005 | Hamada | ................ | H04M 15/83 455/406 |
| 8,423,784 B2* | 4/2013 | Akama | ................. | H04W 60/00 455/435.2 |
| 9,853,478 B2* | 12/2017 | Lee | ......................... | H02J 50/80 |
| 2003/0023376 A1* | 1/2003 | Fujimoto | ........... | G01C 21/3682 340/990 |

(Continued)

FOREIGN PATENT DOCUMENTS

JP 2006013685 A 1/2006

*Primary Examiner* — Dominic E Rego
(74) *Attorney, Agent, or Firm* — Brundidge & Stanger, P.C.

(57) ABSTRACT

A communication interface receives position information from a terminal device being charged. A controller determines that the terminal device is in a first state when the position information received in the communication interface is included in a past charging area and determines that the terminal device is in a second state when the position information received in the communication interface is not included in the past charging area. Upon receiving a signal addressed to the terminal device, the communication interface transmits the signal to the terminal device when the terminal device is in the first state. The communication interface stops the transmission of the signal to the terminal device when the terminal device is in the second state.

14 Claims, 21 Drawing Sheets

(56) References Cited

U.S. PATENT DOCUMENTS

| | | | |
|---|---|---|---|
| 2005/0122259 A1* | 6/2005 | Sairo | G01S 19/25 342/357.25 |
| 2012/0115549 A1* | 5/2012 | Kim | H02J 50/90 455/566 |
| 2012/0206098 A1* | 8/2012 | Kim | B60L 53/39 320/108 |
| 2012/0294463 A1* | 11/2012 | Chu | H04M 1/6041 381/150 |
| 2013/0031121 A1* | 1/2013 | Sera | B60L 53/68 707/E17.014 |
| 2013/0073088 A1* | 3/2013 | Lee | G05D 1/0246 700/259 |
| 2014/0128107 A1* | 5/2014 | An | G01S 5/12 455/457 |
| 2014/0159651 A1* | 6/2014 | Von Novak | H02J 50/60 320/108 |
| 2015/0336462 A1* | 11/2015 | Bell | B60L 53/126 320/108 |
| 2015/0336464 A1* | 11/2015 | Bell | H02J 50/90 320/108 |
| 2016/0297314 A1* | 10/2016 | Iwai | H02J 7/0013 |
| 2016/0375898 A1* | 12/2016 | Breuel | G07C 5/008 340/932.2 |
| 2017/0043675 A1* | 2/2017 | Jones | H02J 50/402 |
| 2018/0152031 A1* | 5/2018 | Zhai | B60L 53/65 |
| 2018/0194466 A1* | 7/2018 | Zhao | G05D 1/102 |
| 2018/0370376 A1* | 12/2018 | Liu | G05D 1/0225 |
| 2019/0027975 A1* | 1/2019 | Plasmans | H02J 50/60 |
| 2020/0159221 A1* | 5/2020 | Wu | G05D 1/0297 |

* cited by examiner

FIG. 7A

| RECEPTION DATE AND TIME | CHARGING POSITION (LATITUDE, LONGITUDE) |
|---|---|
| 2018/6/1 22:26:24 | (Na1, Ea1) |
| 2018/5/30 7:27:13 | (Na2, Ea2) |
| 2018/2/5 10:25:10 | (Na3, Ea3) |
| 2018/3/1 15:28:17 | (Na4, Ea4) |
| 2018/5/15 13:27:22 | (Na5, Ea5) |
| | |
| | |
| . . . . . . . . . . . . . | |

FIG. 7B

| RECEPTION DATE AND TIME | CHARGING POSITION (LATITUDE, LONGITUDE) |
|---|---|
| 2018/4/12 13:32:11 | (Nb1, Eb1) |
| 2018/5/22 14:34:24 | (Nb2, Eb2) |
| 2018/6/1 21:23:65 | (Nb3, Eb3) |
| | |
| | |
| | |
| | |
| . . . . . . . . . . . . . | |

FIG. 7C

| RECEPTION DATE AND TIME | CHARGING POSITION (LATITUDE, LONGITUDE) |
|---|---|
| 2018/6/1 21:34:46 | (Nc1, Ec1) |
| 2018/4/22 17:22:35 | (Nc2, Ec2) |
| 2018/5/21 22:54:21 | (Nc3, Ec3) |
| 2018/5/22 14:23:45 | (Nc4, Ec4) |
| 2018/6/22 15:21:54 | (Nc5, Ec5) |
| 2018/2/22 22:34:12 | (Nc6, Ec6) |
| 2018/5/24 21:32:45 | (Nc7, Ec7) |
| . . . . . . . . . . . . . | |

FIG. 7D

| RECEPTION DATE AND TIME | CHARGING POSITION (LATITUDE, LONGITUDE) |
|---|---|
| 2018/4/30 23:11:34 | (Nd1, Ed1) |
| 2018/3/21 20:32:51 | (Nd2, Ed2) |
| 2018/6/25 8:43:25 | (Nd3, Ed3) |
| 2018/5/21 17:35:29 | (Nd4, Ed4) |
| 2018/3/3 1:21:42 | (Nd5, Ed5) |
| 2018/2/24 4:21:51 | (Nd5, Ed5) |
| | |
| . . . . . . . . . . . . . | |

FIG. 7E

| RECEPTION DATE AND TIME | CHARGING POSITION (LATITUDE, LONGITUDE) |
|---|---|
| 2019/6/1 22:32:12 | (Ne1, Ee1) |
| | |
| | |
| | |
| | |
| | |
| | |
| . . . . . . . . . . . . . | |

FIG. 7F

| RECEPTION DATE AND TIME | CHARGING POSITION (LATITUDE, LONGITUDE) |
|---|---|
| 2018/6/1 3:26:39 | (Nf1, Ef1) |
| 2018/4/12 3:27:53 | (Nf2, Ef2) |
| 2018/5/23 22:43:23 | (Nf3, Ef3) |
| 2018/2/21 11:34:34 | (Nf4, Ef4) |
| 2018/5/11 1:23:11 | (Nf5, Ef5) |
| | |
| | |
| . . . . . . . . . . . . . | |

| TERMINAL ID | TRANSMISSION CONFIRMATION |
|---|---|
| T1 | 0 |
| T2 | 1 |
| T3 | 0 |
| T4 | 0 |
| T5 | 1 |
| T6 | 0 |
| . . . . . . . . . . . . . . . . . | |
| . . . . . . . . . . . . . . . . . | |
| . . . . . . . . . . . . . . . . . | |

362

36

36

100

MANAGEMENT DEVICE AND STORAGE MEDIUM FOR CONTROLLING COMMUNICATION WITH TERMINAL DEVICE

CROSS-REFERENCE TO RELATED APPLICATION

This application is based upon and claims the benefit of priority from the prior Japanese Patent Application No. 2020-42392, filed on Mar. 11, 2020, the entire contents of which is incorporated herein by reference.

BACKGROUND

1. Field

The present invention relates to communication technology and, more particularly, to a management device and a storage medium for controlling communication with a terminal device.

2. Description of the Related Art

It is required to provide a terminal device having a security system that does not require troublesome operations or does not increase the cost with regard to unauthorized use of the terminal device by others. For example, a chargeable position range is set for the terminal device in advance, and charging is permitted when the current position of the terminal device is within the set position range and charging is not permitted at other positions.

[Patent Document 1] Japanese Patent Application Publication No. 2006-13685

According to the technology disclosed in Patent Document 1, since charging can be prohibited at a position other than a preset position such as at home, even if the device is stolen, the device is no longer be usable after a certain period of time. However, there is a possibility that call voice received by a communication application or the like is output when there is remaining battery power. In other words, information leakage cannot be sufficiently prevented.

SUMMARY

A management device according to one aspect of the present embodiment is a management device adapted to manage a terminal device, including: a communication interface that receives position information from a terminal device that is being charged; and a controller that determines that the terminal device is in a first state when the position information received in the communication interface is included in a past charging area and determines that the terminal device is in a second state when the position information received in the communication interface is not included in the past charging area. Upon receiving a signal addressed to the terminal device, the communication interface transmits the signal to the terminal device when the terminal device is in the first state and stops the transmission of the signal to the terminal device when the terminal device is in the second state.

Another aspect of the present embodiment also relates to a management device. This device is a management device adapted to manage a terminal device, including: a communication interface that receives position information from a terminal device that is being charged; and a controller that determines that the terminal device is in a first state when the position information received in the communication interface is included in a past charging area and determines that the terminal device is in a second state when the position information received in the communication interface is not included in the past charging area. Upon receiving a signal addressed to the terminal device, the communication interface transmits the signal to the terminal device when the terminal device is in the first state and transmits a signal for requesting identity verification to the terminal device and controls communication with the terminal device in accordance with the result of the identity verification received from the terminal device when the terminal device is in the second state.

Optional combinations of the aforementioned constituting elements and implementations of the present embodiments in the form of methods, apparatuses, systems, recording mediums, and computer programs may also be practiced as additional modes of the present embodiments.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 7A to 7F are diagrams showing a data structure of a charging position table;

FIG. 8 is a diagram showing a data structure of a transmission confirmation table;

DETAILED DESCRIPTION

The invention will now be described by reference to the preferred embodiments. This does not intend to limit the scope of the present invention, but to exemplify the invention.

(First Exemplary Embodiment)

Figure 1:
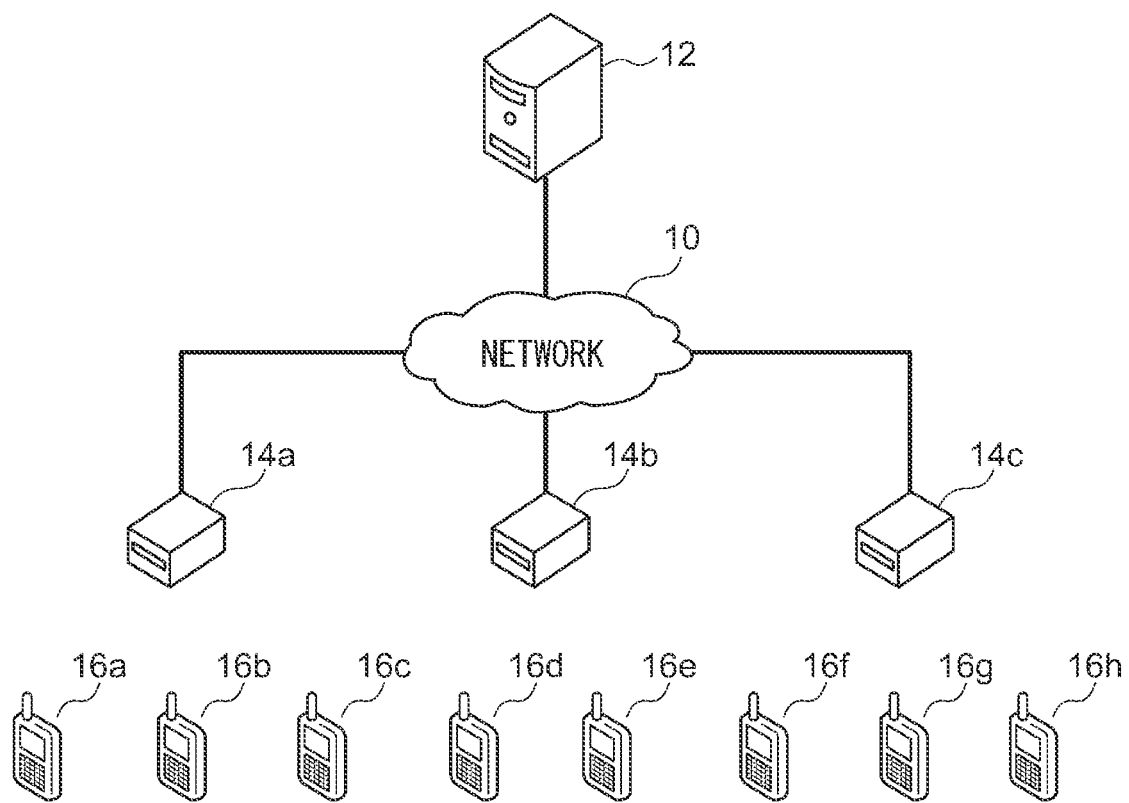
FIG. 1 is a diagram showing the configuration of a communication system according to the first exemplary embodiment.

FIG. 1 is a diagram showing the configuration of a communication system 100. The communication system 100 includes a network 10, a management device 12, a first base station device 14a, a second base station device 14b, and a third base station device 14c, which are collectively referred to as base station devices 14, and a first terminal device 16a, . . . , and an eighth terminal device 16h, which are collectively referred to as terminal devices 16. The number of base station devices 14 included in the communication system 100 is not limited to "3", and the number of terminal devices 16 is not limited to "8". The numbers may be more or less than 3 and 8, respectively.

The terminal devices 16 are also called IP transceivers or push-to-talk over cellular (PoC) transceivers and execute voice communication. Voice communication is a push-to-talk method, and individual calling, group calling, simultaneous calling, and neighborhood calling are also possible. When group calling is made from a certain terminal device 16, a call is transmitted to all the terminal devices 16 that belong to the same group as the group to which the terminal device 16 of the transmission source belongs. Further, when simultaneous calling is made, a call is transmitted to all the terminal devices 16 used in a wireless communication system. In order to execute such voice communication, a terminal device 16 is connected to a base station device 14. Half-duplex or full-duplex communication is used as the communication method between the base station device 14 and the terminal device 16. In the present exemplary embodiment, an example in which the terminal device 16 is an IP transceiver will be described. However, this example is non-limiting. For example, the terminal device 16 may be a mobile phone. Further, the voice communication is not limited to the push-to-talk method and may be a full-duplex voice communication by a mobile phone or the like. Further, not limited to voice calls, data communication for exchanging text data and the like may be performed.

A plurality of base station devices 14 are connected to one another by the network 10. The network 10 is, for example, an internet protocol (IP) network. The management device 12 is connected to the network 10. The management device 12 is configured by, for example, a session initiation protocol (SIP) server or the like and executes a SIP sequence process used when a call is made between the terminal devices 16.

In such a configuration, the user of a terminal device 16 executes a voice call with another user using another terminal device 16 by pressing a call button of the terminal device 16. When the communication method is half-duplex communication, in a plurality of terminal devices 16 related to a certain voice call, while one user is pressing the call button and speaking, other users cannot speak even when the users press a call button. Further, in the IP wireless communication system, it is also possible to install an IP wireless communication application on a mobile phone terminal such as a smartphone and use the mobile phone terminal as a terminal device 16. Installation of the IP wireless communication application on the mobile phone terminal allows for a push-to-talk call with another terminal device 16 or a mobile phone terminal on which another IP wireless communication application is installed.

There is a case where smartphones that have just been released or are of popular models get stolen for the purpose of resale. Further, a smartphone may be lost away from home due to carelessness of the user. In addition, smartphones can generally be charged with a battery using a general-purpose cable or the like, and even an unauthorized owner can charge a smartphone so as to start and use the smartphone continuously. If an IP wireless communication application (communication application) is installed on a smartphone and used in an IP wireless communication system, call information is also transmitted to smartphones stolen by a thief or smartphones found by a finder after being lost. Depending on the IP wireless communication application, there are cases where received call voice is set to be output even when the screen of the smartphone is locked in order to ensure the immediacy of the call. At this time, when highly confidential call information is transmitted to the above-mentioned smartphone, there is a possibility that the thief or the finder may hear the call information.

Figure 2:
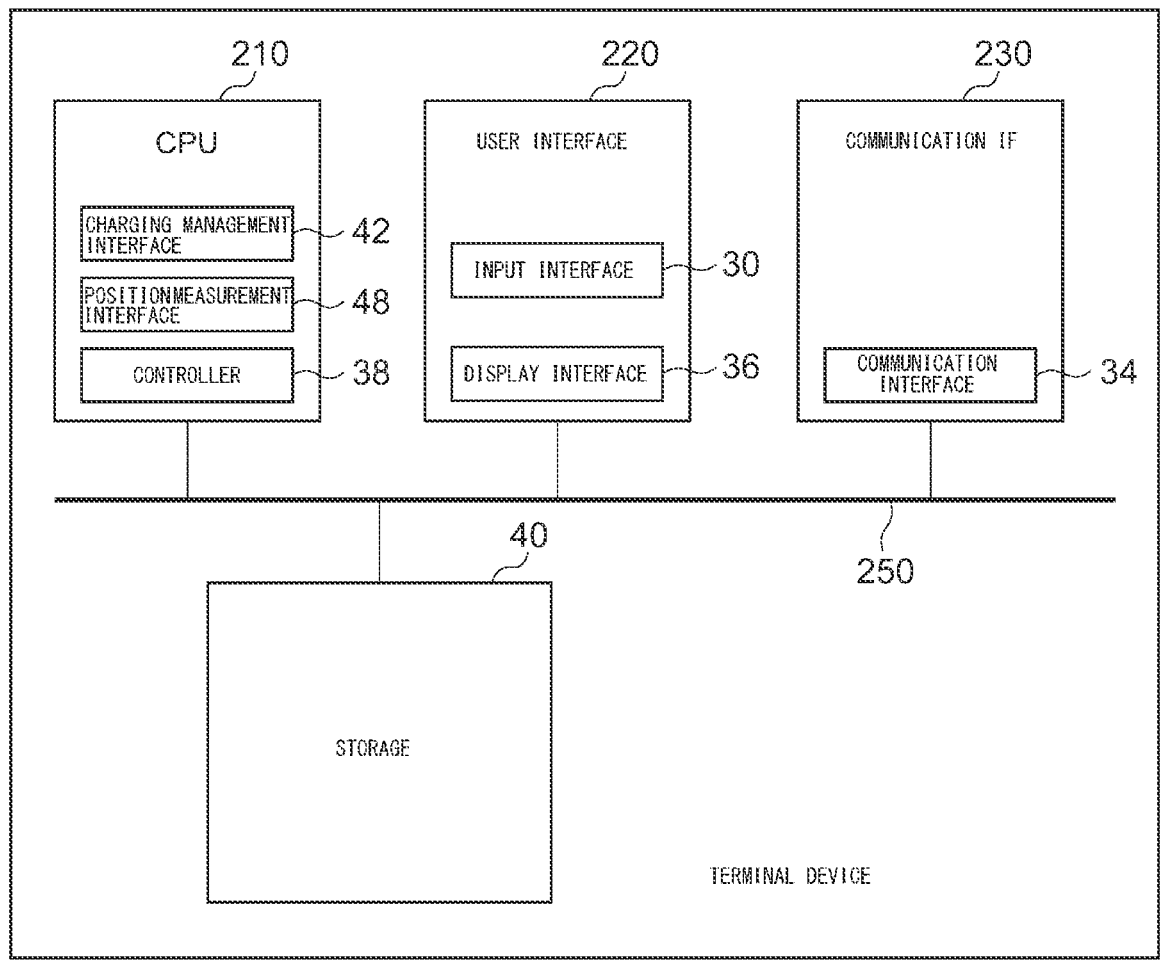
FIG. 2 is a diagram showing the hardware configuration and functional blocks of a terminal device.

FIG. 2 shows the hardware configuration and functional blocks of a terminal device 16. The terminal device 16 includes a CPU 210, a user interface (IF) 220, a communication IF 230, and a storage 40. The CPU 210, the user IF 220, the communication IF 230, and the storage 40 are connected by a bus 250.

The user IF 220 is an interface for the user. The user IF 220 receives information from the user and presents information to the user. The communication IF 230 communicates with a base station device 14 using wireless communication. Further, the communication IF communicates with a management device 12 via the base station device 14. The storage 40 is a medium for storing information and is composed of, for example, a non-volatile semiconductor memory.

The CPU 210 is, for example, a central processing unit (CPU) or a micro processing unit (MPU), has various calculation functions, and may have a memory for calculation in the inside thereof. The CPU 210 includes a controller 38, a charge management interface 42, and a position measurement interface 48, the user IF 220 includes an input interface 30 and a display interface 36, and the communication IF 230 includes a communication interface 34.

Figure 3:
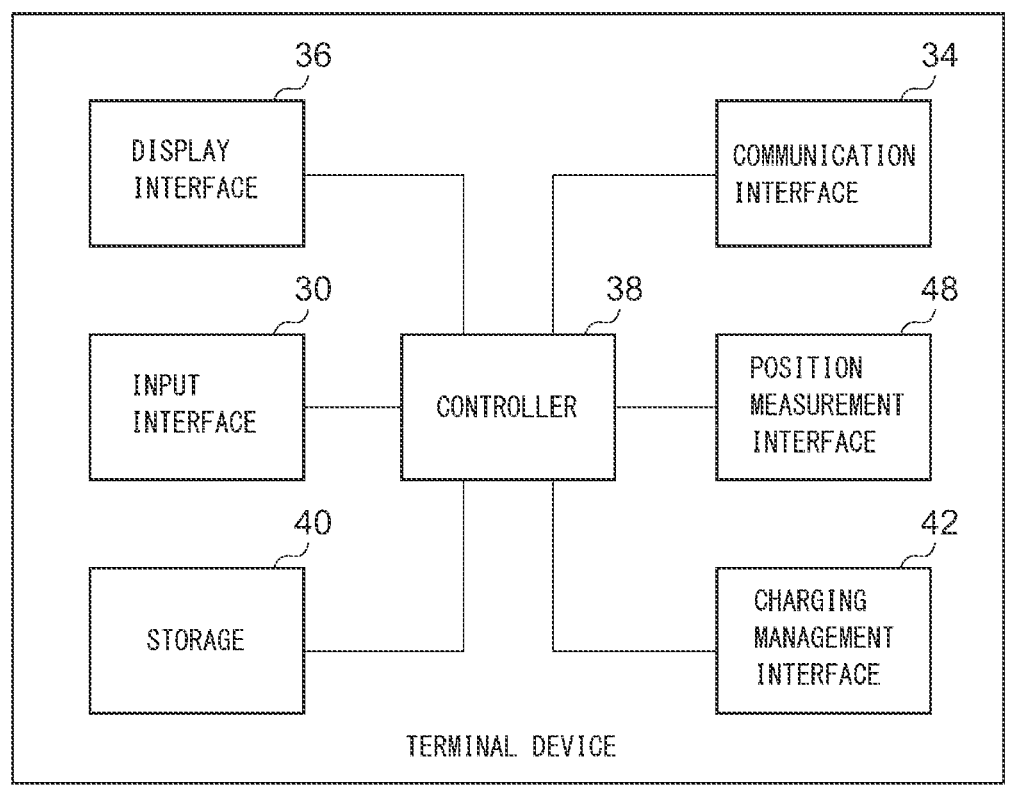
FIG. 3 is a diagram showing detailed functional blocks of the terminal device.

FIG. 3 shows detailed functional blocks of a terminal device 16. The terminal device 16 includes an input interface 30, a communication interface 34, a display interface 36, a controller 38, a storage 40, a charge management interface 42, and a position measurement interface 48. An example of the terminal device 16 is a mobile phone terminal (smartphone or the like) in which an IP wireless communication application is installed.

The input interface 30 includes various buttons for the user of the terminal device 16 to operate, an input device such as a touch panel, and an interface for notifying the controller 38 of the status of the input device. The input interface 30 and the display interface 36 described later may be integrally formed by using a touch panel. A call button that is pressed when making a call is also arranged at the input interface 30. Further, an operation button pressed when operating a peripheral device is also arranged at the input interface 30. The pressed status of the call button and the operation button is detected by the input interface 30 and input to the controller 38.

The storage 40 records the setting information and the like of the terminal device 16. The display interface 36 is an interface for displaying the settings of the terminal device 16 and the call status and is, for example, a display. The communication interface 34 uses a communication system 100 provided by a mobile communication operator to communicate with the management device 12 and other terminal devices 16 via the base station device 14. The position measurement interface 48 measures the position where the terminal device 16 currently exists. More specifically, the position measurement interface 48 acquires the latitude and longitude of the current location from the global positioning system (GPS) device. The charge management interface 42 manages a process of charging a battery built in the terminal device 16. More specifically, when charging of the terminal device 16 is started or when charging is completed, the charge management interface 42 notifies the controller 38 of the start and end of charging. Further, even when the charging management interface 42 is being charged, the charging management interface 42 notifies the controller 38 of the fact that the battery is being charged, the amount of charge of the battery, and the like.

Figure 4:
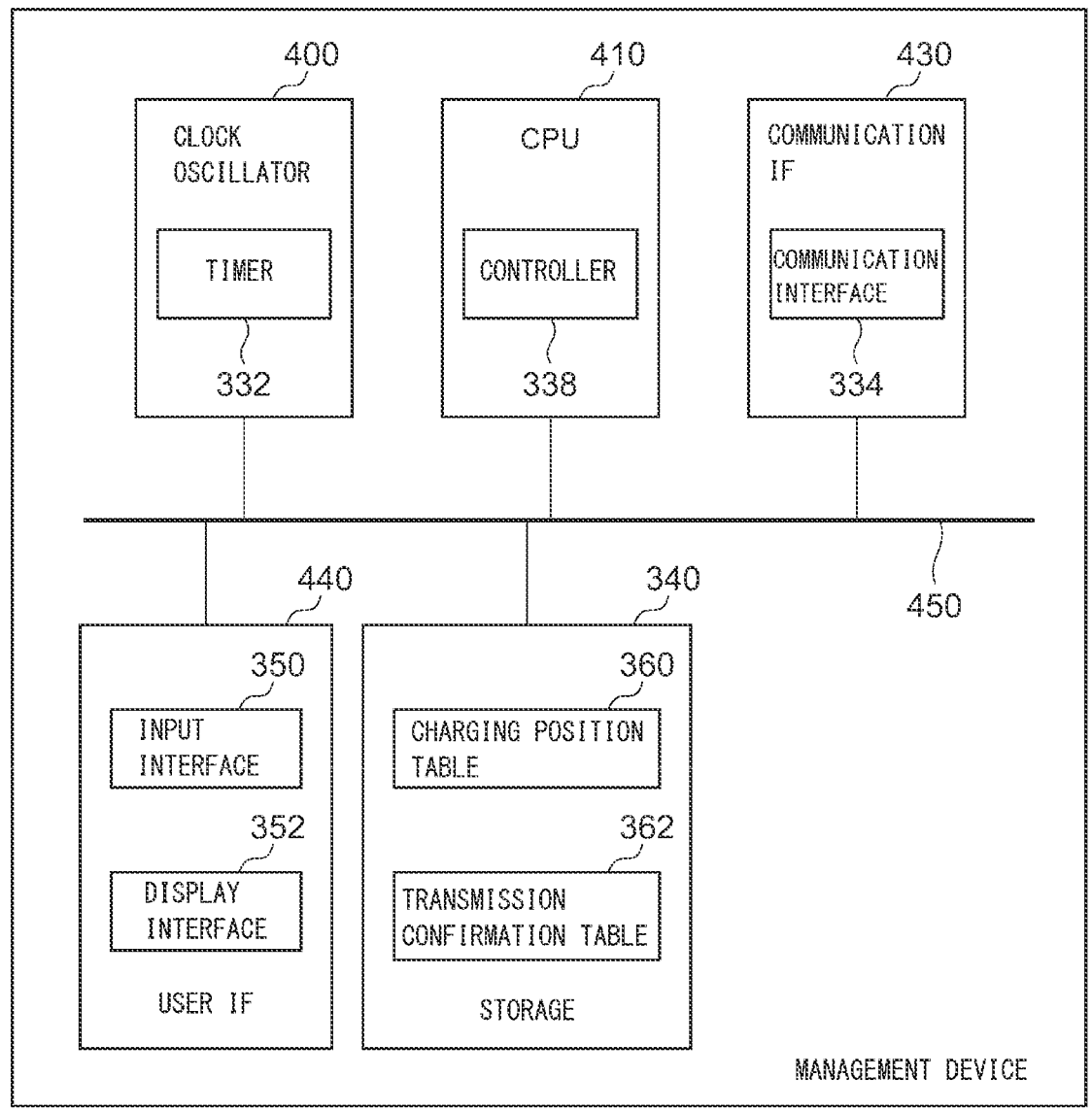
FIG. 4 is a diagram showing the hardware configuration and functional blocks of a management device.

FIG. 4 shows the hardware configuration and functional blocks of the management device 12. The management device 12 includes a clock oscillator 400, a central processing unit (CPU) 410, a communication IF 430, a user IF 440, and a storage 340. The clock oscillator 400, the CPU 410, the communication IF 430, the storage 340, and the user IF 440 are connected by a bus 450.

The clock oscillator 400 is, for example, a crystal oscillator and generates a signal having a constant frequency. The CPU 410 executes the process in the management device 12. The communication IF 430 is connected to the network 10 and communicates with the base station device 14. Further, the communication IF 430 communicates with the terminal device 16 via the base station device 14. The user IF 440 is an interface for the user. The user IF 440 receives information from the user and presents information to the user. The storage 340 is a medium for storing information, for example, a hard disk or a solid state drive (SSD).

The clock oscillator 400 includes a timer 332, the CPU 410 includes a controller 338, the communication IF 430 includes a communication interface 334, and the user IF 440 includes an input interface 350 and a display interface 352. The storage 340 includes a charging position table 360 and a transmission confirmation table 362.

Figure 5:
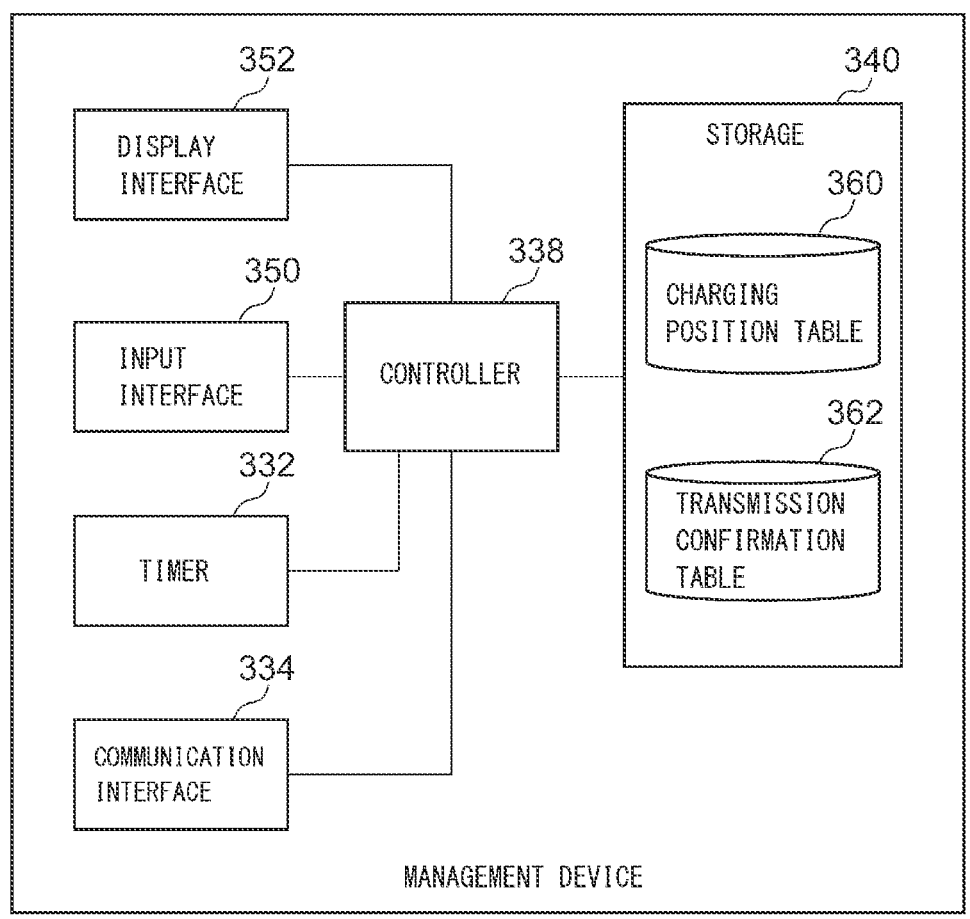
FIG. 5 is a diagram showing detailed functional blocks of the management device.

FIG. 5 shows detailed functional blocks of the management device 12. The management device 12 includes a timer 332, a communication interface 334, a controller 338, a storage 340, an input interface 350, and a display interface 352. The storage 340 includes a charging position table 360 and a transmission confirmation table 362. The display interface 352 is an interface for displaying the settings of the management device 12. The input interface 350 is an interface such as various buttons and a touch panel for setting the management device 12. A touch panel may be used to integrally form the display interface 352 and the input interface 350. The communication interface 334 uses a communication system 100 provided by the mobile communication operator so as to communicate with the terminal device 16. The timer 332 acquires the current time. The charging position table 360 and the transmission confirmation table 362 are recorded in the storage 340. The details of the charging position table 360 and the transmission confirmation table 362 will be described later.

Figure 6:
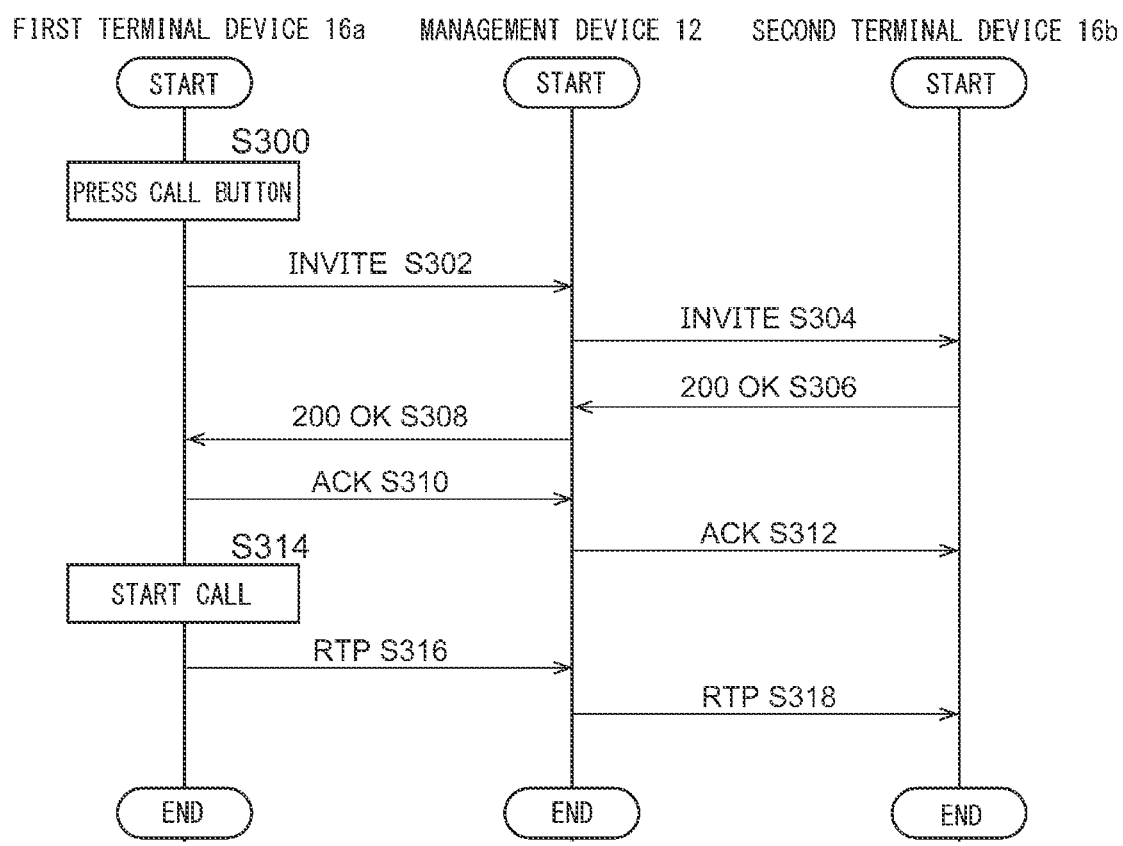
FIG. 6 is a sequence diagram showing an SIP sequence performed by a communication system.

Next, a communication protocol (SIP communication) process performed between the terminal device 16 and the management device 12 will be described in the present exemplary embodiment. FIG. 6 is a sequence diagram showing an SIP sequence performed by the communication system 100. When making a call from the first terminal device 16a to the second terminal device 16b, after a call button is pressed on the first terminal device 16a (S300), the first terminal device 16a transmits INVITE to the second terminal device 16b (S302). The transmitted INVITE is transmitted to the second terminal device 16b via the management device 12 (S304). After receiving INVITE, the second terminal device 16b transmits a status code 200 OK to the first terminal device 16a (S306). The transmitted status code 200 OK is transmitted to the first terminal device 16a via the management device 12 (S308). After receiving the status code 200 OK, the first terminal device 16a transmits ACK (Acknowledge) (S310). The transmitted ACK is transmitted to the second terminal device 16b via the management device 12 (S312). After transmitting ACK, the first terminal device 16a starts transmitting call data using RTP (S314, S316, and S318).

Next, the details of processes of the management device 12 and the terminal device 16 at the time of charging in the present exemplary embodiment will be described. When the charging of the terminal device 16 is started, the controller 38 of the terminal device 16 acquires position information (latitude, longitude) of a place where the terminal device 16 currently exists from the position measurement interface 48 and transmits the position information to the management device 12 via the communication interface 34. The position information (latitude, longitude) on where the terminal device 16 is being charged is also referred to as terminal device charging position information or charging position information. The controller 38 of the terminal device 16 may transmit the position information to the management device 12 at a predetermined cycle (for example, 10 minutes) during a period when the terminal device 16 is charging. Further, the controller 38 may transmit the time and position information obtained at the time of the starting of the charging and the time and position information obtained at the time of the completion of the charging to the management device 12. The terminal device 16 may transmit the date and time (measurement date and time) at which the position information is measured to the management device 12. The position information transmitted from the terminal device 16 is input to the controller 338 via the communication interface 334 of the management device 12. Upon receiving the position information, the controller 338 of the management device 12 executes a charging position information determination process described later and updates the charging position table 360 and the transmission confirmation table 362 in the storage 340.

FIGS. 7A-7F show a data structure of the charging position table 360. In the charging position table 360, the time at which the user of each terminal device 16 performed charging in the past and the position information (latitude, longitude) for where the charging was performed are recorded. The charging position table 360 of each terminal device 16 is recorded independently for each terminal device 16. FIG. 7A shows a charging position table 360a of the first terminal device 16a, FIG. 7B shows a charging position table 360b of the second terminal device 16b, and FIG. 7C shows a charging position table 360c of the third terminal device 16c. Further, FIG. 7D shows a charging position table 360d of the fourth terminal device 16d, FIG. 7E shows a charging position table 360e of the fifth terminal device 16e, and FIG. 7F shows a charging position table 360f of the sixth terminal device 16f. For the reception date and time, the date and time when the management device 12 received position information from each terminal device 16 are listed. Further, "2018/6/1 22:26:24", which is an example of the reception date and time listed, indicates that the reception date and time are "Jun. 1, 2018 at 22 o'clock 26 minutes 24 seconds". When the terminal device 16 transmits the measurement date and time of the position information to the management device 12, the measurement date and time instead of the reception date and time may be recorded in the charging position table 360. Alternatively, both the reception date and time and the measurement date and time may be recorded in the charging position table 360. For the charging position, the position information (latitude, longitude) recorded in the position information received from the terminal device 16 is listed.

FIG. 8 shows a data structure of the transmission confirmation table 362. The transmission confirmation table 362 records the settings for transmission confirmation in the case of making a call to each terminal device 16 and records the records for all the terminal devices 16 used in the communication system 100. Each record is stored in association with a "terminal ID" field and a "transmission confirmation" field. In the terminal ID, the respective IDs of the terminal devices 16 are indicated as T1 to T6, and these correspond to the first terminal device 16a to the sixth terminal device 16f, respectively. The transmission confirmation is information for controlling communication, and "0" or "1" is set in a charging position information determination process described later. The details of the transmission confirmation will be described later.

Next, the details of the charging position information determination process will be described. The communication interface 334 of the management device 12 receives position information from a terminal device 16 being charged. When the controller 338 receives the position information, the controller 338 identifies a charging position table 360T corresponding to the terminal device 16 (hereinafter, also referred to as terminal device 16T) that has transmitted the position information. For example, when the position information is received from the second terminal device 16b, a charging position table 360b of the second terminal device 16b shown in FIG. 7B is identified as the charging position table 360T. Hereinafter, an explanation will be given on the assumption that the position information is received from the second terminal device 16b. The controller 338 of the management device 12 acquires position information P (latitude, longitude) received from the second terminal device 16b. Next, the controller 338 of the management device 12 determines whether or not there exists a record R having position information Q (latitude, longitude) that can be determined to represent the same point as that according to the position information P in the charging position table 360b of the second terminal device 16b identified above. The position information Q that can be determined to represent the same point is position information that matches the position information P, or position information whose distance from the position information P is equal to or less than a predetermined threshold value (for example, 10 meters). When the latitude and longitude in the position information P are denoted as (Np, Ep) and the latitude and longitude of the position information Q are denoted as (Nq, Eq), the distance d [km] between (Np, Ep) and (Nq, Eq) can be calculated by the following expression.
[Expression 1]

In this case, α is an average distance per one degree of latitude, and for example, α=111 km. Further, β is an average distance per one degree of longitude, and for example, β=91 km. In correspondence with typical latitudes and longitudes (for example, every one degree of latitude and every one degree of longitude), α and β may be stored and the values thereof may be used. When the position information P and the position information Q are determined to represent the point, a point P and a point Q are also considered to be in the same area.

When the record R exists, that is, when it is determined that the second terminal device 16b has been charged in the same area as that according to the position information P in the past, the controller 338 of the management device 12 acquires the current time CT from the timer 332 and updates (overwrites) the reception time of the record R to the time CT and the reception position (latitude, longitude) of the record R to the position information P. Further, the controller 338 sets the transmission confirmation of the record of the second terminal device 16b of the transmission confirmation table 362 to "0". When the record R does not exist, that is, when it is determined that the second terminal device 16b has never been charged at the position information P in the past, the controller 338 of the management device 12 transmits an identity verification notification to the second terminal device 16b via the communication interface 334.

Figure 9:
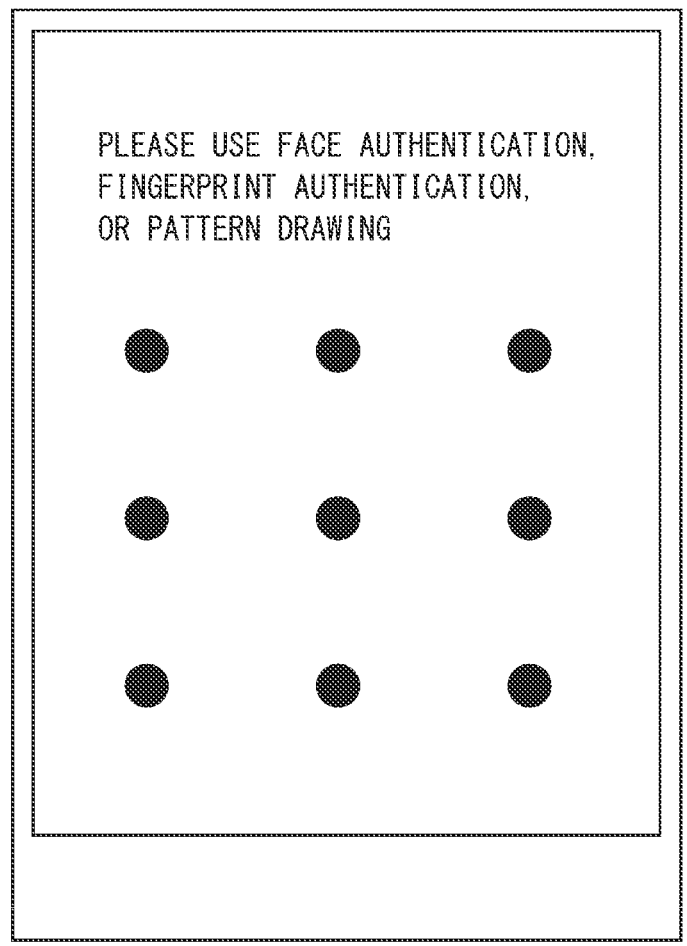
FIG. 9 is a diagram showing a screen displayed on a display of a terminal device.

When the controller 38 of the second terminal device 16b receives the identity verification notification from the management device 12 via the communication interface 34, the controller 38 determines whether or not the second terminal device 16b is charged by an authorized user. The authorized user of the second terminal device 16b in the present exemplary embodiment refers to a user whose face information, fingerprint information, etc., match those registered in the second terminal device 16b match. In the determination process, the controller 38 of the second terminal device 16b displays a screen for performing identity verification on the display interface 36. FIG. 9 is a screen displayed on the display interface 36 of a terminal device 16 and is a screen for performing identity verification. In this figure, face authentication, fingerprint authentication, and pattern drawing are used as means for performing identity verification as examples. Alternatively, other authentication methods may be used. For example, password (passcode) authentication or voiceprint authentication may be used. Further, in order to notify the user that this screen has been displayed, the housing of the terminal device 16 may be vibrated, or a notification sound or announcement for notification may be output.

When the user of the second terminal device 16b verifies his/her identity by any method, that is, when it is determined that the second terminal device 16b is being charged by an authorized user, the controller 38 of the second terminal device 16b transmits "OK" to the management device 12 via the communication interface 34 as an identity verification response. When the user of the second terminal device 16b cannot verify his/her identity by the by any method or when a timeout occurs after a predetermined period of time (for example, three minutes) has elapsed, that is, when it is determined that the second terminal device 16b is not being charged by an authorized user, the controller 38 of the second terminal device 16b transmits "NG" to the management device 12 via the communication interface 34 as an identity verification response.

Upon receiving an identity verification response from the second terminal device 16b via the communication interface 334, the controller 338 of the management device 12 checks the details of the identity verification response. When the identity verification response is "OK", that is, when it is confirmed that the second terminal device 16b is being charged by an authorized user, the controller 338 of the management device 12 acquires the current time CT from the timer 332 and updates (adds the information to) the charging position table 360b of the second terminal device 16b together with the position information P transmitted from the second terminal device 16b. Further, the controller 338 sets the transmission confirmation of the record of the second terminal device 16b of the transmission confirmation table 362 to "0". When the identity verification response is "NG", that is, when it is confirmed that the second terminal device 16b is not being charged by the authorized user, the controller 338 of the management device 12 sets the transmission confirmation of the record of the second terminal device 16b of the transmission confirmation table 362 to "1".

As described above, the charging position table 360 and the transmission confirmation table 362 in the storage 340 of the management device 12 are updated by the charging position information determination process. The charging position table 360 records the position information on where charging is being performed only if the identity is verified when each terminal device 16 starts charging and does not record position information on where charging is being performed if the identity is not verified. Thereby, the charging position table 360 stores a charging area used by the authorized user in the past. When the identity is not verified, the transmission confirmation of the record of the terminal device 16 in the transmission confirmation table 362 is set to "1".

In general, when charging a terminal device 16 such as a smartphone, the charging place is often a place where the user usually resides (user's living area) such as the user's home or workplace. When charging the terminal device 16 at the user's home or workplace, the position information on the user's home or workplace is recorded in the charging position table 360 by verifying the identity once through the charging position information determination process. In other words, the charging position table 360 records position information on where the user of the terminal device 16 charges the terminal device 16 on a daily basis.

When the management device 12 receives position information that is not recorded in the charging position table 360, the identity verification is performed through the charging position information determination process. When the identity is verified, it can be determined that the user of the terminal device 16 has added a new charging place. On the other hand, when the identity is not verified, it can be determined that there is a possibility that a third party who is not an authorized user has started charging the terminal device 16 due to theft or loss of the terminal device 16. At this time, the transmission confirmation of the record of the terminal device 16 in the transmission confirmation table 362 is set to "1". In other words, there is a high possibility that the terminal device 16 with the transmission confirmation in the transmission confirmation table 362 of "1" is used by a third party who is not an authorized user, and when a call is made to the terminal device 16, it can be determined that the terminal device 16 has a high possibility of leaking the call information to the third party.

Even in a terminal device 16 with transmission confirmation that is set to "1" in the transmission confirmation table 362 due to the absence of identity verification through the charging position information determination process for some reason even when the user is an authorized user, the transmission confirmation in the transmission confirmation table 362 is set to "0" when the identity verification through the charging position information determination process is performed again later or when the charging is performed at the position information (latitude, longitude) recorded in the charging position table 360.

In other words, the controller 338 determines whether the position information received by the communication interface 334 is included in the past charging area stored in the charging position table 360, and when the position information is included in the past charging area, the controller 338 determines the transmission confirmation to be "0", that is, determines that the terminal device 16 is in the first state, and stores the state in the storage 340. On the other hand, when the position information received by the communication interface 334 is not included in the charging position table 360, the controller 338 determines the transmission confirmation to be "1", that is, determines that the terminal device 16 is in the second state, and stores the state in the storage 340. When the controller 338 determines that the terminal device 16 is in the second state, the communication interface 334 transmits a signal for requesting identity verification to the terminal device 16. The controller 338 changes the stored state of the terminal device 16 to the first state when the result of the identity verification received by the communication interface 334 indicates the authorized user. Further, the storage 340 stores the charging position table 360 in which the past charging area is shown. The controller 338 adds the position information received by the communication interface 334 to the charging position table 360 when the result of the identity verification received by the communication interface 334 indicates the authorized user.

In the present exemplary embodiment, when the controller 338 of the management device 12 receives a call start request from a certain terminal device 16, more specifically, when the controller 338 receives INVITE from the first terminal device 16a in the SIP sequence according to FIG. 6, the controller 338 checks the value of the transmission confirmation of the second terminal device 16b, which is a transmission destination terminal device 16, in reference to the transmission confirmation table 362. When the transmission confirmation of the second terminal device 16b is "0", the controller 338 of the management device 12 transmits INVITE to the second terminal device 16b and executes a normal SIP sequence. When the transmission confirmation of the second terminal device 16b is "1", the controller 338 of the management device 12 does not transmit INVITE to the second terminal device 16b but instead transmits a status code 410 or the like to the first terminal device 16a, which is a terminal device 16 of the transmission source, and ends the call process.

In other words, upon receiving a signal addressed to the terminal device 16 via the communication interface 334, the controller 338 transmits the signal to the terminal device 16 when the terminal device 16 is in the first state. On the other hand, upon receiving a signal addressed to the terminal device 16 via the communication interface 334, the controller 338 stops the transmission of the signal to the terminal device 16 when the terminal device 16 is in the second state.

Figure 10:
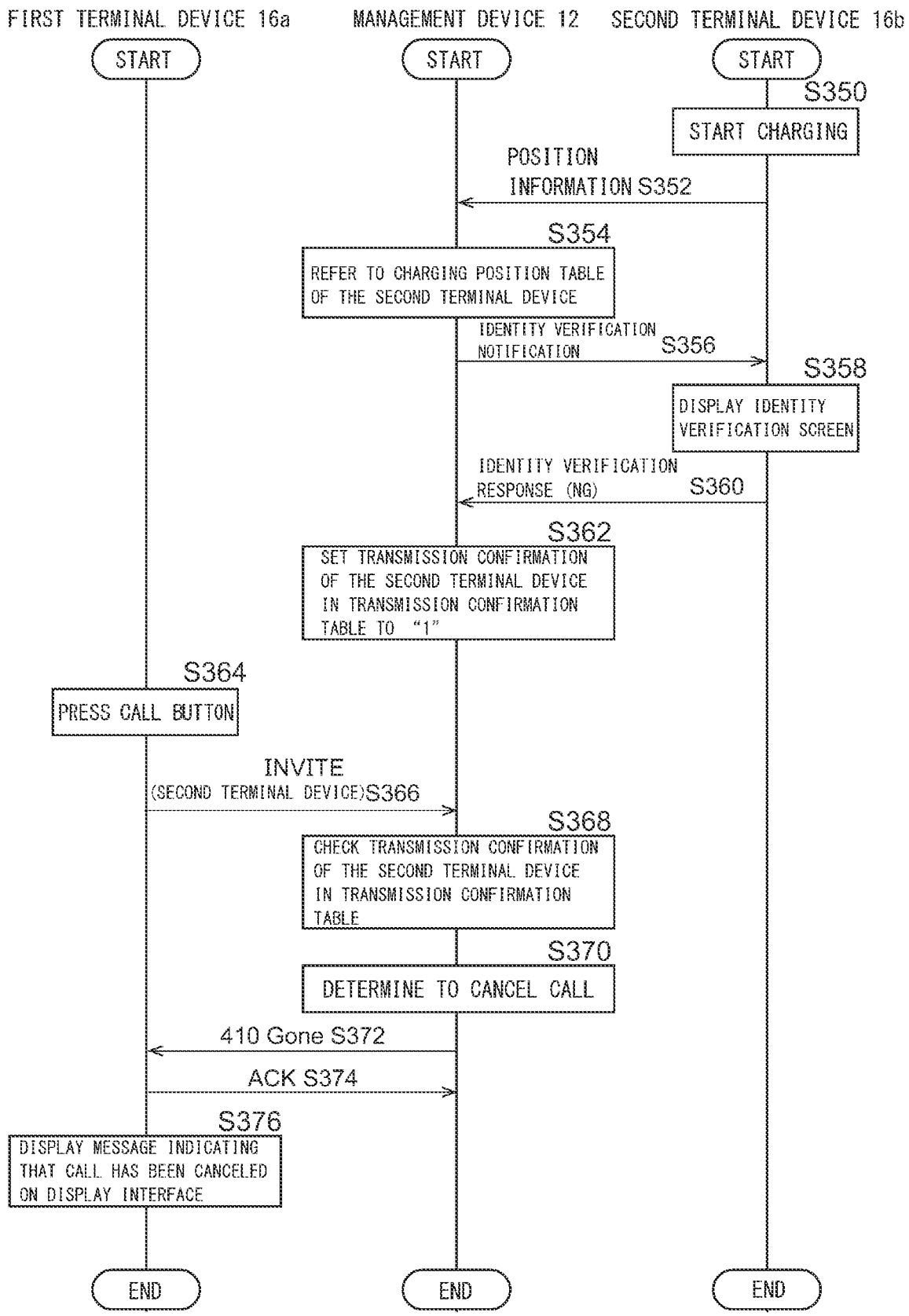
FIG. 10 is a sequence diagram showing processes and data flow in terminal devices and a management device.

FIG. 10 is a sequence diagram showing processes and data flow in the terminal devices 16 and the management device 12. The figure shows processes and data flow for a case where it is determined by the charging position information determination process that the second terminal device 16b is being used by a third party who is not an authorized user and a call to the second terminal device 16b is then canceled. The controller 38 of the second terminal device 16b transmits position information to the management device 12 (S352) after the charging is started (S350). After receiving the position information, the controller 338 of the management device 12 refers to the charging position table 360b of the second terminal device 16b and determines whether or not position information corresponding to the position information (latitude, longitude) received from the second terminal device 16b is recorded (S354). Since the corresponding position information is not recorded, the controller 338 of the management device 12 transmits an identity verification notification to the second terminal device 16b (S356). After receiving the identity verification notification, the controller 38 of the second terminal device 16b displays a screen for performing identity verification on the display interface 36 (S358). Since no identity verification has been performed thereafter, the controller 38 transmits an identity verification response (NG) to the management device 12 (S360). After receiving the identity verification response (NG) from the second terminal device 16b, the controller 338 of the management device 12 sets the transmission confirmation of the record of the second terminal device 16b in the transmission confirmation table 362 to "1" (S362).

Figure 11:
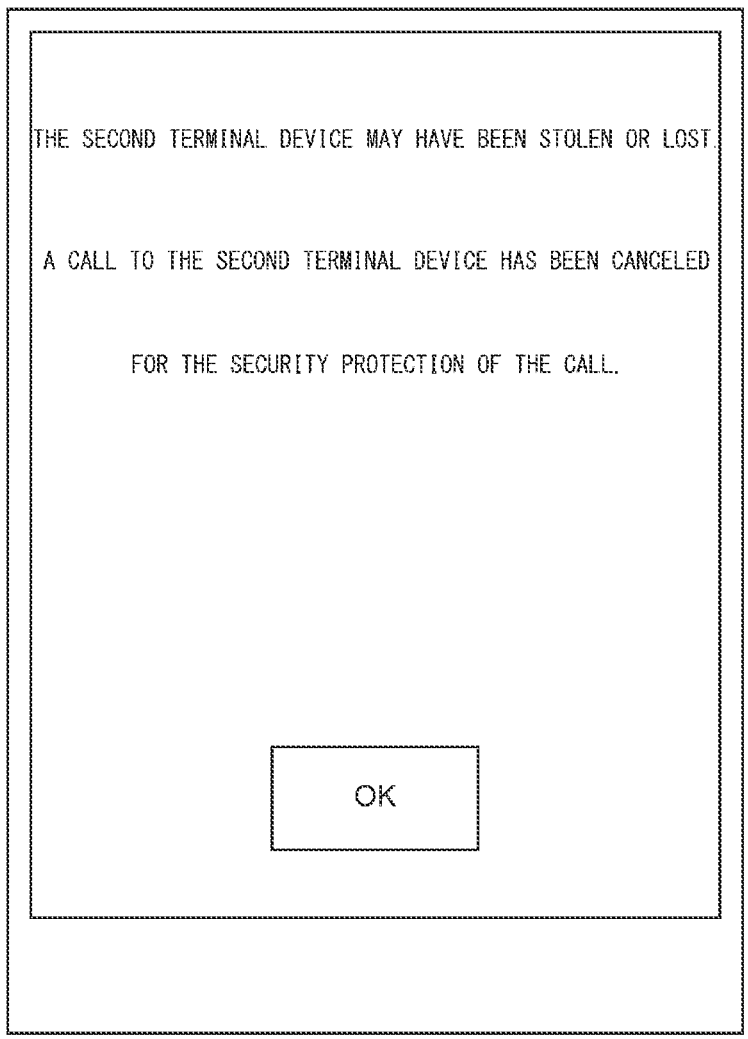
FIG. 11 is a diagram showing a screen displayed on a display of a terminal device.

When the call button is then pressed on the first terminal device 16a (S364) and a call from the first terminal device 16a to the second terminal device 16b is generated (S366), the controller 338 of the management device 12 checks the transmission confirmation of the second terminal device 16b in the transmission confirmation table 362 (S368), determines to cancel the call to the second terminal device 16b since the transmission confirmation of the second terminal device 16b is "1" (S370), and transmits a status code 410 to the first terminal device 16a, which is the transmission source (S372). When receiving the status code 410 from the management device 12, the controller of the first terminal device 16a transmits ACK to the management device 12 (S374) and displays a message indicating that the call has been canceled on the display interface 36 (S376). FIG. 11 shows an example of a screen displayed on the display interface 36 of the terminal device 16. For example, a message "The second terminal device may have been stolen or lost. A call to the second terminal device has been canceled for the security protection of the call." is displayed.

According to the first exemplary embodiment, with regard to a terminal device 16 used in the IP wireless communication system, by performing identity verification by the user at the time of the charging of the terminal device 16, position information (latitude, longitude) on the place where the user of the terminal device 16 charges the terminal device on a daily basis is identified, and the position information is recorded by the management device 12. By determining whether or not the user of the terminal device 16 is an authorized user using the position information and canceling the transmission of a call if the user is not the authorized user, it is possible to prevent a situation in which highly confidential call information is leaked to a third party in a case where the terminal device 16 is stolen or lost.

Figure 12:
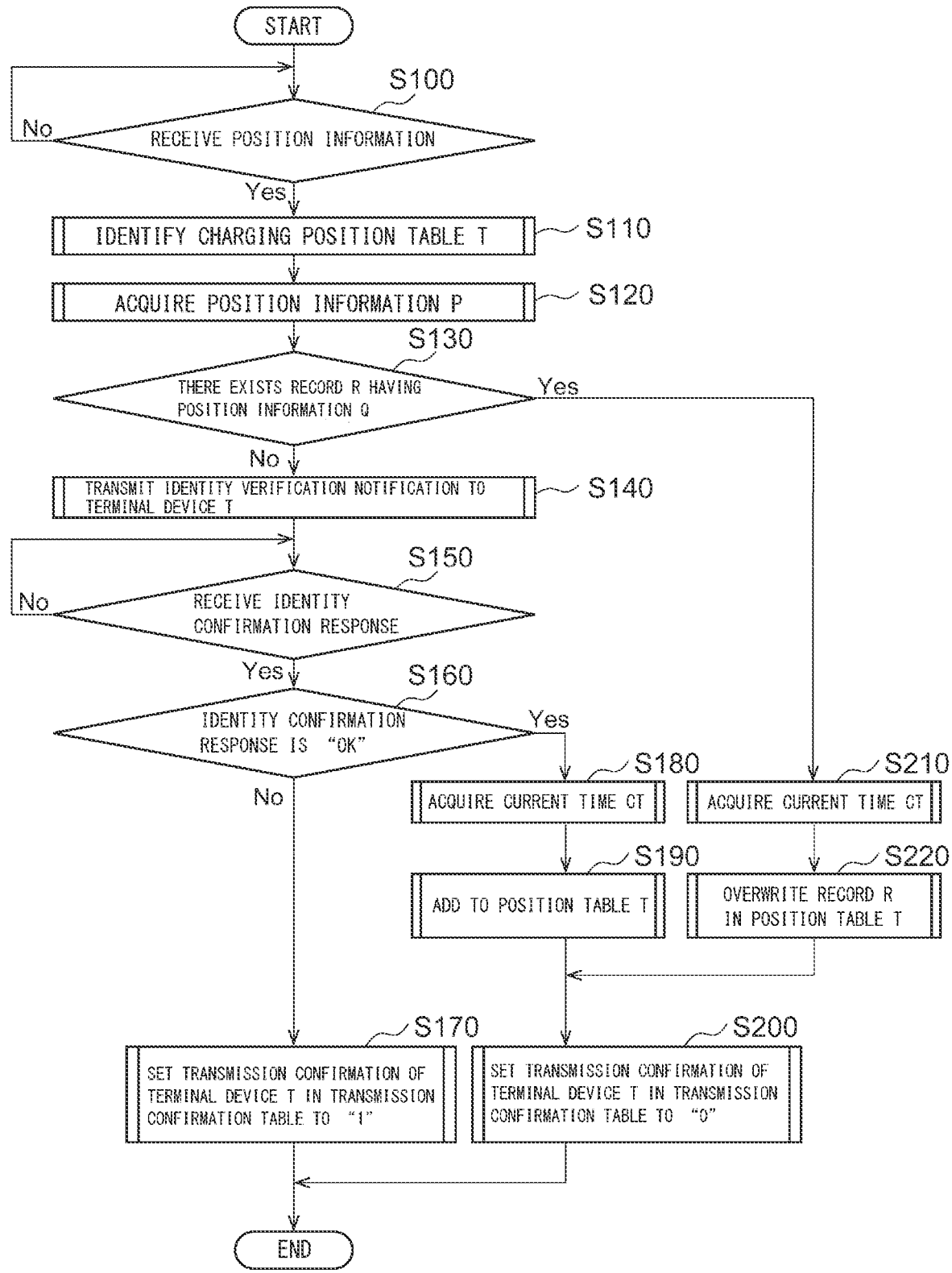
FIG. 12 is a flowchart illustrating a processing procedure in the management device.

FIG. 12 is a flowchart showing the charging position information determination process executed by the controller 338 of the management device 12. In S100, the controller 338 of the management device 12 determines whether or not the position information has been received from the terminal device 16. When the position information has been received (S100: Yes), the process proceeds to S110. When the position information has not been received (S100: No), the process returns to S100 so as to repeat the process. In S110, the controller 338 of the management device 12 identifies a charging position table 360T corresponding to the terminal device 16 (terminal device 16T) that is the transmission source of the position information received in S100. The process then proceeds to S120. In S120, the controller 338 of the management device 12 acquires position information P received in S100. The process then proceeds to S130.

In S130, the controller 338 of the management device 12 determines whether or not there exists a record R having position information Q that can be determined to represent the same point as that according to the position information P in the charging position table 360T of the terminal device 16T. When the record R exists (S130: Yes), the process proceeds to S210. When the record R does not exist (S130: No), the process proceeds to S140. In S140, the controller 338 of the management device 12 transmits an identity verification notification to the terminal device 16T via the communication interface 334. The process then proceeds to S150. In S150, the controller 338 of the management device 12 determines whether or not the identity verification response has been received from the terminal device 16T. When the identity verification response has been received (S150: Yes), the process proceeds to S160. When the identity verification response has not been received (S150: No), the process returns to S150 so as to repeat the process. When the identity verification response cannot be received even after waiting for a predetermined period of time (for example, one minute) or longer in S150, the process proceeds to S160.

In S160, the controller 338 of the management device 12 determines whether or not the identity verification response received in S150 is "OK". If the identity verification response is "OK" (S160: Yes), the process proceeds to S180. If the identity verification response is not "OK" (S160: No), the process proceeds to S170. Further, if the identity verification response has not been received, the process also proceeds to S170. In S170, the controller 338 of the management device 12 sets the transmission confirmation of the record of the terminal device 16T in the transmission confirmation table 362 to "1". Then, the process ends.

In S180, the controller 338 of the management device 12 acquires the current time CT from the timer 332. The process then proceeds to S190. In S190, the controller 338 of the management device 12 adds the current time CT and the position information P to the charging position table 360T of the terminal device 16T. The process then proceeds to S200. In S200, the controller 338 of the management device 12 sets the transmission confirmation of the record of the terminal device 16T in the transmission confirmation table 362 to "0". Then, the process ends. In S210, the controller 338 of the management device 12 acquires the current time CT from the timer 332. The process then proceeds to S220. In S220, the controller 338 of the management device 12 overwrites the current time CT and the position information P on the record R in the charging position table 360T of the terminal device 16T. Then, the process proceeds to S200 from S220.

In the present exemplary embodiment, a process is employed where position information on where identity verification has been performed at the time of charging performed in the past in the charging position information determination process keeps being retained in the charging position information determination process. Alternatively, the reception date and time and the current time may be compared so as to perform the identity verification again. For example, after the determination indicating Yes is made in S130 in the flowchart in FIG. 12, in S215 (not shown), which is after the current time CT is acquired in S210, whether or not a predetermined period (for example, one month) or more has passed from the reception date and time of the record R to the current time CT is determined, and if the predetermined period (for example, one month) or more has passed (S215: Yes), the process proceeds to S140 so as to transmit an identity verification notification. If the identity verification response is determined to be "OK" in the subsequent S160, the process proceeds to S220, and if the identity verification response is not determined to be "OK", the process proceeds to S170. In the case of "No" in S215, the process proceeds to S220. This makes it possible to prevent the leakage of call information with higher accuracy even when the terminal device 16 is stolen or lost after the user of the terminal device 16 has charged the terminal device 16 in a temporary shared charging space or the like in the past.

The user of the terminal device 16 may be able to set a threshold value related to the distance between the position information P and the position information Q, that is, a threshold value for determining whether or not the position information P is included in a past charging area. For example, at an appropriate timing after the identity verification is successful, a screen for the user to input the threshold value is displayed on the display interface 36 in the terminal device 16. After the user sets the threshold value via the input interface 30, the controller 38 transmits the threshold value to the management device 12 via the communication interface 34. The controller 338 of the management device 12 receives the threshold value via the communication interface 334 and stores the threshold value in the storage 340. In order to be able to set a threshold value for each user, the storage 340 stores the terminal ID (or user ID) in association with the threshold value. The controller 338 may read the threshold value corresponding to the terminal device 16 to be processed from the storage 340 in S130 and use the threshold value for the above determination process. That is, when there exists a record R having the position information Q whose distance from the position information P is equal to or less than the threshold value, it may be determined that the position information P is included in the past charging area.

Also, one user may be able to set a plurality of threshold values. For example, a threshold value may be able to be set for each charging position. In that case, the threshold value may be stored in the charging position table 360 in correspondence with the charging position (latitude, longitude). By performing such a process, the convenience of the user is improved. For example, when the charging position is the user's home, the threshold value is preferably set to a relatively small value since the rooms in the home are relatively close to one other and the charging position is within a relatively narrow range. By performing setting in this way, it becomes easy to detect an abnormality when the charging is performed in a neighboring house. On the other hand, when the charging position is the user's workplace, there is a possibility of performing the charging in a conference room or the like in addition to the own desk, and the charging position may be widely distributed compared to home. Thus, the threshold value is preferably set to a relatively large value. By performing setting in this way, the places where charging can be performed in the workplace are expanded, and the convenience of the user is improved.

According to the present exemplary embodiment, when the position information on a terminal device is included in a charging position table, the transmission to the terminal device is continued, and when the position information on the terminal device is not included in the charging position table, the transmission to the terminal device is stopped. Thus, information leakage can be prevented even when the terminal device is used in an unauthorized manner. Further, if the terminal device is not used in an unauthorized manner, a call can be made as usual.

In addition, when the terminal device is used by a third party who is not an authorized user, it is possible to prevent highly confidential call information from being leaked to the third party. Further, in the communication system, when a terminal device in which an IP wireless communication application is installed is stolen or lost, it is possible to prevent highly confidential call information from being leaked to a third party. Further, since identity verification is performed when the position information on the terminal device is not included in the charging position table, the state of the terminal device can be accurately acquired. In addition, since the position information on where the terminal device is charged on a daily basis is stored in the management device and identity verification is performed at a new charging location, it is possible to estimate the possibility that the terminal device has been stolen or lost. Further, since the position information when the identity is verified is added to the charging position table, it is possible to flexibly handle various usage forms of the terminal device. Since the user of the terminal device does not need to register the position where the terminal device is used in advance, the convenience of the user can be improved.

(Second Exemplary Embodiment)

Subsequently, a second embodiment will be described. In the first exemplary embodiment, when the transmission confirmation of a transmission destination terminal device 16 is set to "1" in the transmission confirmation table 362, the controller 338 of the management device 12 cancels a call. In the second exemplary embodiment, a process of automatically switching the transmission method when transmitting a call to a terminal device 16 with transmission confirmation that is set to "1" will be described. A communication system 100, a terminal device 16, and a management device 12 according to the second exemplary embodiment are of the same type as those in FIGS. 1 to 5. A description will be made mainly regarding the difference from the previous figures.

Figure 13A:
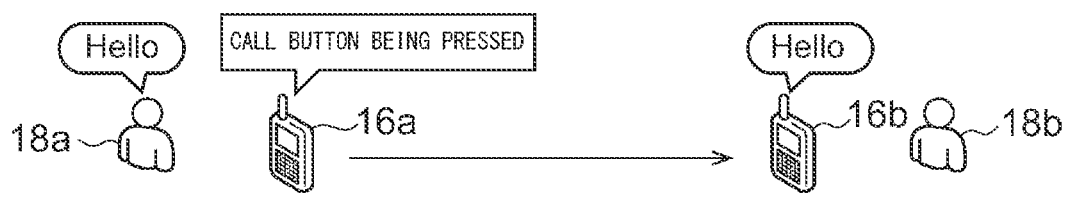
FIGS. 13A to 13B are diagrams showing a general outline of normal transmission in a communication system according to the second exemplary embodiment.
Figure 13B:
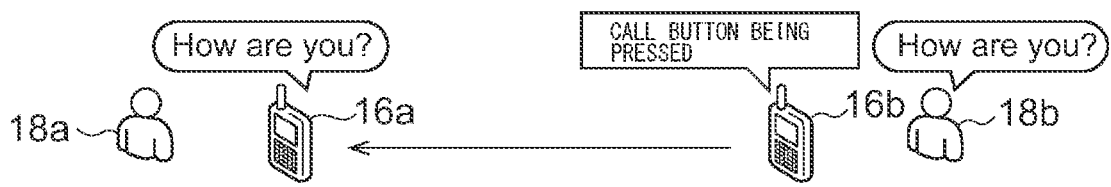

In an IP wireless communication system, when a terminal device 16 makes a call, it may be possible to select either "normal transmission" or ring back tone (hereinafter referred to as "RBT") transmission. In a communication system 100 in the present exemplary embodiment, the terminal device 16 selects either "normal transmission" or "RBT transmission" to perform communication. FIGS. 13A to 13B show the outline of the normal transmission in the communication system 100. Here, communication between two terminal devices 16, the first terminal device 16a and the second terminal device 16b, is premised. Alternatively, communication between three or more terminal devices 16 may be performed, or one-to-many group communication may be performed. The first terminal device 16a is used by the first user 18a, and the second terminal device 16b is used by the second user 18b. Also, a case of using half-duplex communication is assumed.

In FIG. 13A, while the first user 18a is pressing down a call button on the first terminal device 16a, a voice call between the first user 18a and the second user 18b is started even without the operation of the second terminal device 16b by the second user 18b. More specifically, while the first user 18a is pressing down the call button on the first terminal device 16a, the voice uttered by the first user 18a is converted into a voice signal and the voice signal is transmitted from the first terminal device 16a to the second terminal device 16b. The second terminal device 16b reproduces the received voice signal and outputs the voice. FIG. 13B is a process that follows that in FIG. 13A, and while the second user 18b is pressing down a call button on the second terminal device 16b, the voice uttered by the second user 18b is converted into a voice signal and the voice signal is transmitted from the second terminal device 16b to the first terminal device 16a. The first terminal device 16a reproduces the received voice signal and outputs the voice. In this way, the respective call buttons are alternately pressed down by the first user 18a and the second user 18b so as to make a call.

Figure 14A:
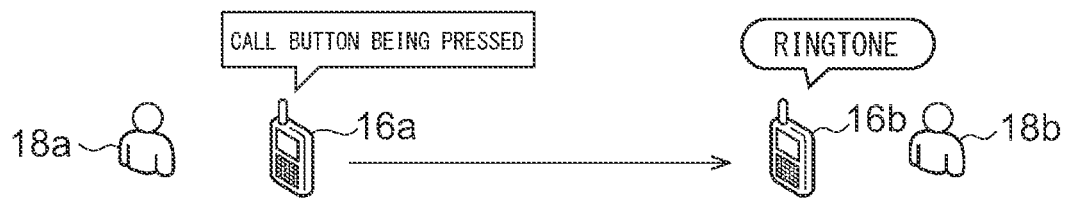
FIGS. 14A to 14D are diagrams showing a general outline of RBT transmission in the communication system.
Figure 14B:
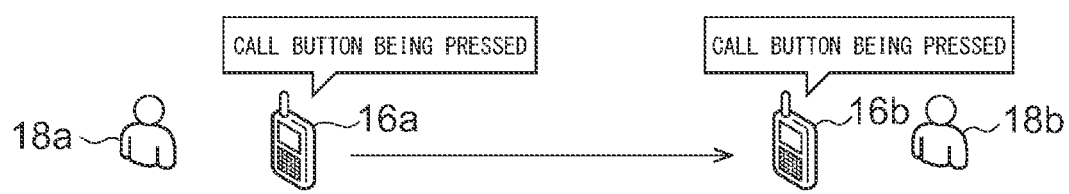

FIGS. 14A to 14B show the outline of RBT transmission in the communication system 100. FIGS. 14A to 14D are shown in the same way as in FIGS. 13A to 13B. While the first user 18a is pressing down the call button on the first terminal device 16a, the first terminal device 16a outputs a calling tone. The second terminal device 16b does not start a voice call and outputs a ringtone. FIG. 14B is a process that follows that in FIG. 14A, and when the second user 18b who hears the ringtone performs a predetermined operation such as pressing the call button on the second terminal device 16b, the transition is made to the start of a call in FIG. 14C. When the first user 18a stops pressing the call button on the first terminal device 16a (releases the call button), the call shown in FIG. 14C ends. If the second user 18b keeps pressing the call button on the second terminal device 16b within a predetermined period of time from the end of the call, a callback call (callback) from the second terminal device 16b to the first terminal device 16a starts. This state is shown in FIG. 14D. In a callback call in response to RBT transmission, normally, the calling tone of the second terminal device 16b and the ringtone of the first terminal device 16a are not output, and the call enters a conversation state immediately.

Figure 14C:
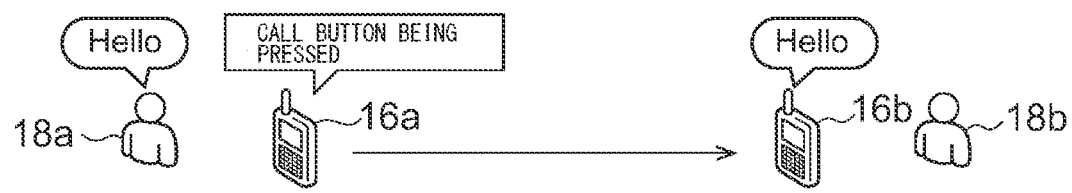
Figure 14D:
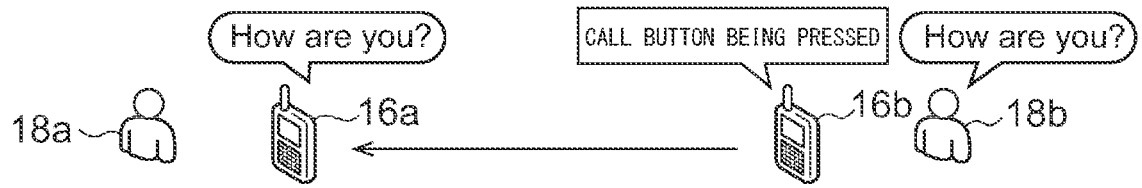

If the second user 18b presses the call button on the second terminal device 16b after a predetermined period of time has passed since the end of the call in FIG. 14C, new RBT transmission is made instead of a callback call. In this case, the calling tone of the second terminal device 16b and the ringtone of the first terminal device 16a are output. As described, in the RBT transmission, it is necessary to operate the terminal device 16 on the receiving side (destination side) in order to start a voice call. Therefore, the RBT transmission is used when it is necessary to securely convey information to a transmission destination. In the above description, the RBT transmission is executed by the operation of continuously pressing the call button. Alternatively, the RBT transmission may be executed by another operation. For example, RBT transmission may be executed by pressing the call button once (for a short period of time). That is, in the normal transmission, the call enters a conversation state without a predetermined operation performed by the terminal device 16 on the receiving side (destination side), and the voice is output from the terminal device 16 on the receiving side. On the other hand, in the RBT transmission, if the terminal device 16 on the receiving side does not perform a predetermined operation, the call does not enter a conversation state, and the voice is not output from the terminal device 16 on the receiving side.

Figure 15A:
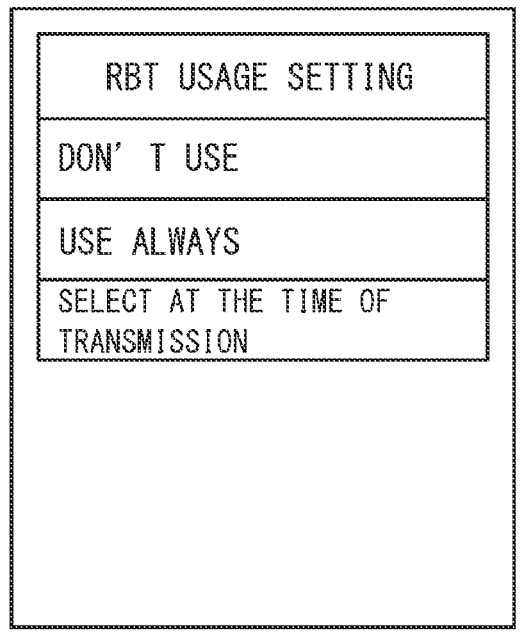
FIGS. 15A to 15B are diagrams showing a screen displayed on a display of a terminal device.
Figure 15B:
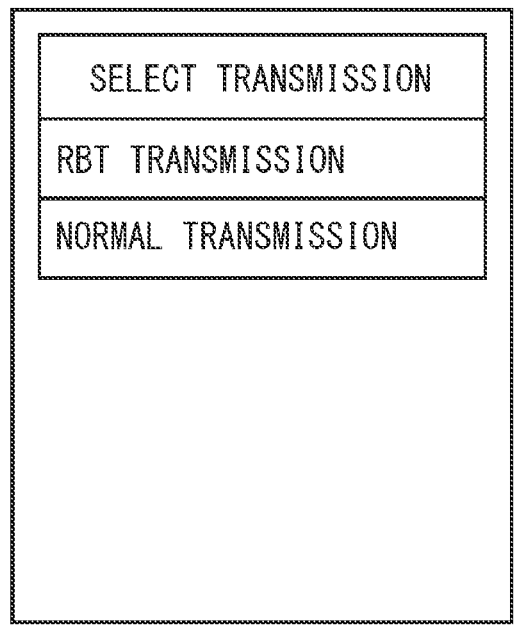

Switching between the normal transmission and the RBT transmission is generally based on the setting in the terminal device 16 on the transmission side. In a terminal device 16, when "normal transmission" is set, or when "normal transmission or RBT transmission at the time of transmission" is set and "normal transmission" is selected at the time of transmission, normal transmission is performed. FIGS. 15A to 15B show a screen displayed on the display interface 36 of a terminal device 16. This is a screen example for making settings related to the normal transmission and the RBT transmission in the terminal device 16. Using an RBT usage setting screen in FIG. 15A, the operation at the time of transmission is set. When "don't use" is set, the normal transmission is performed after pressing the call button. When "use always" is set, the RBT transmission is performed after pressing the call button. When "select at the time of transmission" is set, a select-at-the-time-of-transmission screen in FIG. 15B is displayed after pressing the call button. That is, the user 18 selects the normal transmission or the RBT transmission each time a call is started (for each outgoing call). When "RBT transmission" is selected on the select-at-the-time-of-transmission screen in FIG. 15B, the RBT transmission is performed. When "normal transmission" is selected, the normal transmission is performed. Note that "normal transmission" is often referred to as "first communication mode", and "RBT transmission" is often referred to as "second communication mode".

Figure 16A:
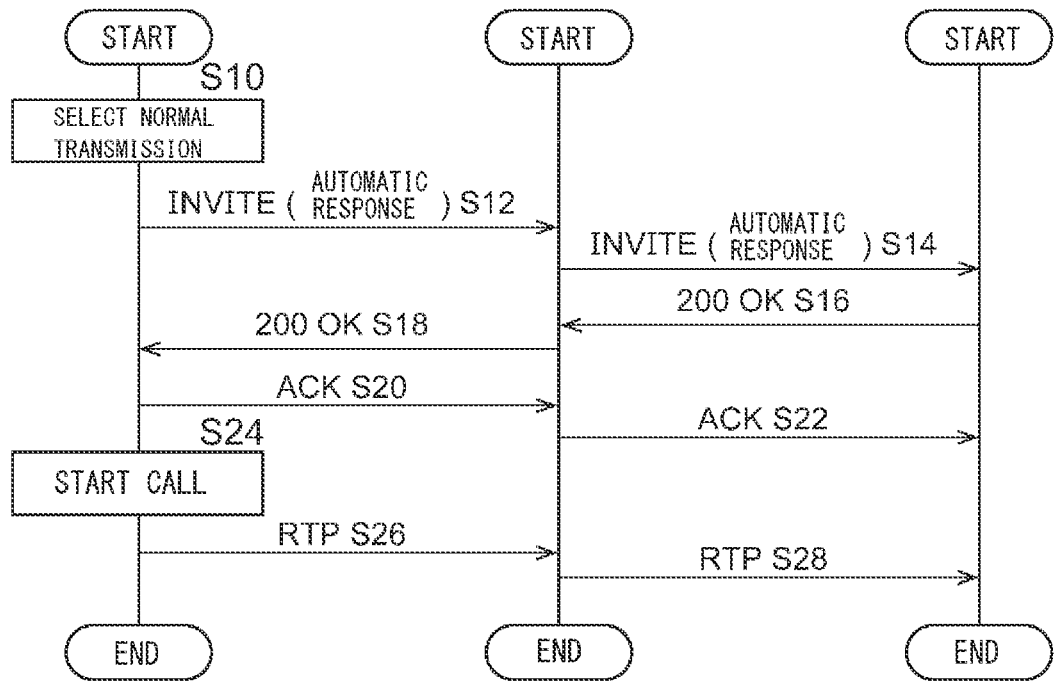
FIG. 16A to 16B are sequence diagrams showing a general outline of transmission in the communication system.
Figure 16B:
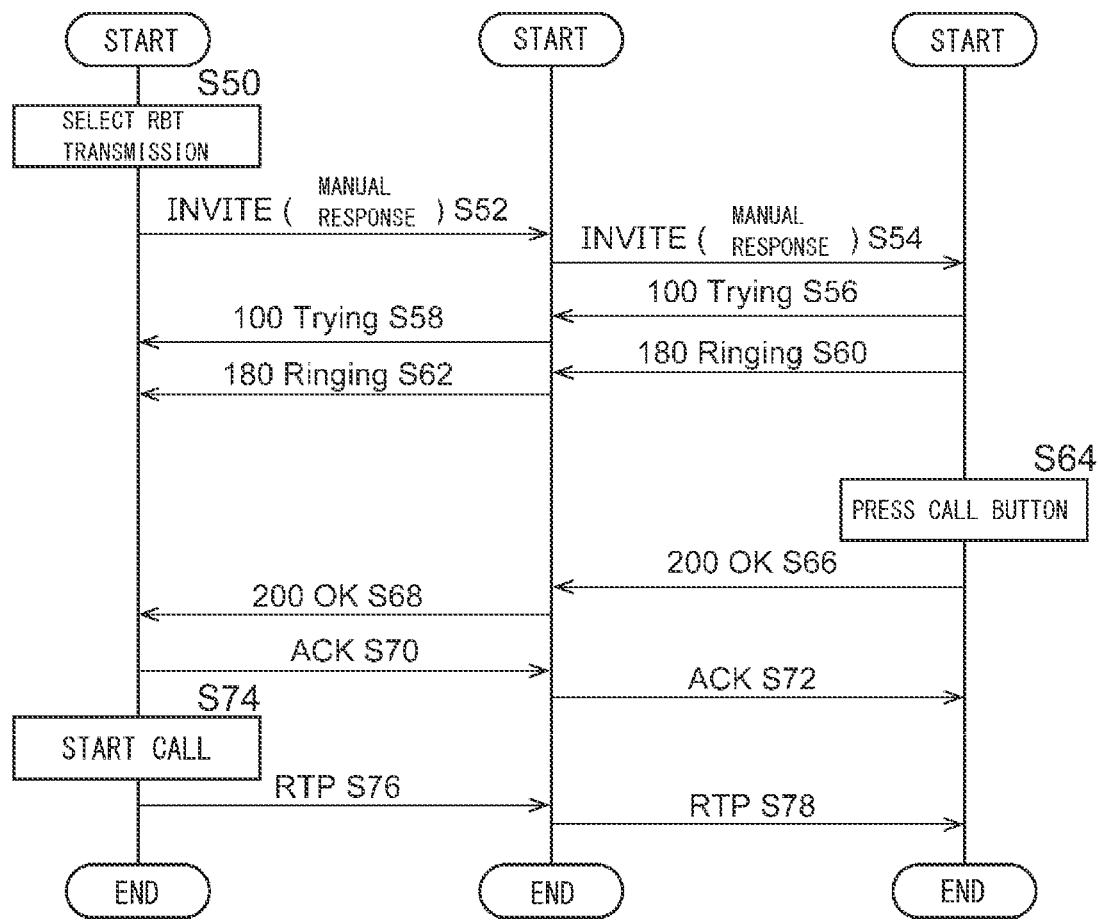

FIG. 16A to 16B are sequence diagrams showing a general outline of two transmission methods in the communication system 100. FIG. 16A shows a procedure when the normal transmission from the first terminal device 16a to the second terminal device 16b is performed in the SIP communication. After the normal transmission is selected in the first terminal device 16a (S10), the first terminal device 16a transmits INVITE (automatic response) to the second terminal device 16b (S12). The transmitted INVITE (automatic response) is transmitted to the second terminal device 16b via the management device 12 (S14). After receiving INVITE (automatic response), the second terminal device 16b transmits a status code 200 OK to the first terminal device 16a (S16). The transmitted status code 200 OK is transmitted to the first terminal device 16a via the management device 12 (S18). After receiving the status code 200 OK, the first terminal device 16a transmits ACK (Acknowledge) (S20). The transmitted ACK is transmitted to the second terminal device 16b via the management device 12 (S22). After transmitting ACK, the first terminal device 16a starts transmitting call data using RTP (S24, S26, and S28). Communication between the first and second terminal devices 16a and 16b and the management device 12 is performed via the base station device 14. However, for the sake of brevity of explanations, the base station device 14 is omitted in FIG. 16A.

FIG. 16B shows a procedure when the RBT transmission from the first terminal device 16a to the second terminal device 16b is performed in the SIP communication. After the RBT transmission is selected in the first terminal device 16a (S50), the first terminal device 16a transmits INVITE (manual response) to the second terminal device 16b (S52). The transmitted INVITE (manual response) is transmitted to the second terminal device 16b via the management device 12 (S54). After receiving INVITE (manual response), the second terminal device 16b transmits a status code 100 Trying to the first terminal device 16a (S56). The transmitted status code 100 Trying is transmitted to the first terminal device 16a via the management device 12 (S58). After transmitting the status code 100 Trying, the second terminal device 16b transmits a status code 180 Ringing to the first terminal device 16a (S60). The transmitted status code 180 Ringing is transmitted to the first terminal device 16a via the management device 12 (S62). The first terminal device 16a stays on standby without starting a call until the first terminal device 16a receives ACK.

After that, when the call button on the second terminal device 16b is pressed (S64), the second terminal device 16b transmits a status code 200 OK to the first terminal device 16a (S66). The transmitted status code 200 OK is transmitted to the first terminal device 16a via the management device 12 (S68). After receiving the status code 200 OK, the first terminal device 16a transmits ACK (S70). The transmitted ACK is transmitted to the second terminal device 16b via the management device 12 (S72). After transmitting ACK, the first terminal device 16a starts transmitting call data using RTP (S74, S76, and S78).

In the present exemplary embodiment, when the controller 338 of the management device 12 receives a call start request by the normal transmission or the RBT transmission from the first terminal device 16a, more specifically, when the controller 338 receives INVITE (automatic response) or INVITE (manual response) from the first terminal device 16a in the SIP sequence according to FIGS. 16A to 16B, the controller 338 checks the value of the transmission confirmation of the second terminal device 16b, which is a transmission destination terminal device 16, in reference to the transmission confirmation table 362. When the transmission confirmation of the second terminal device 16b is "0", the controller 338 of the management device 12 transmits INVITE (automatic response) or INVITE (manual response) to the second terminal device 16b and executes a normal SIP sequence. When the transmission confirmation of the second terminal device 16b is "1", the controller 338 of the management device 12 does not transmit INVITE (automatic response) or INVITE (manual response) to the second terminal device 16b, but transmits INVITE (identity verification).

Figure 17A:
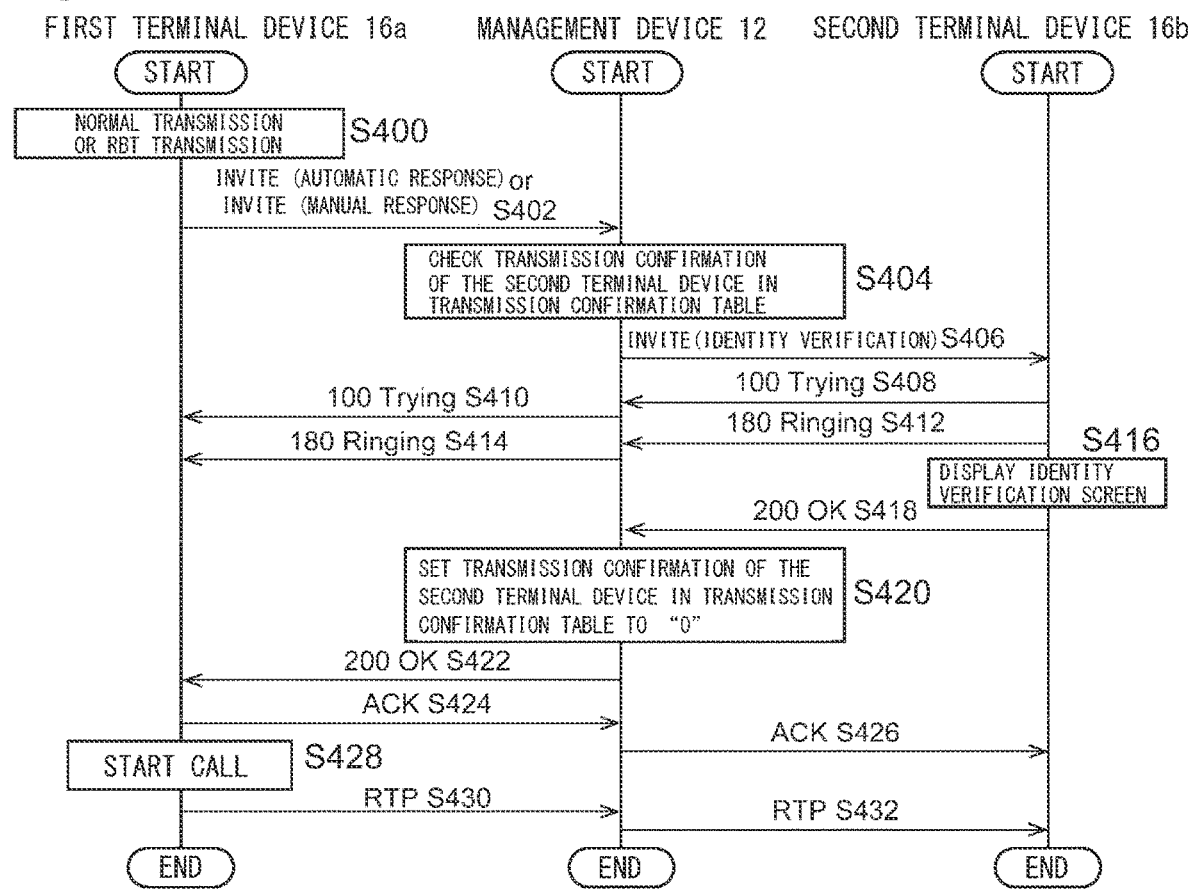
FIGS. 17A to 17B are sequence diagrams showing a SIP sequence performed by the communication system.
Figure 17B:
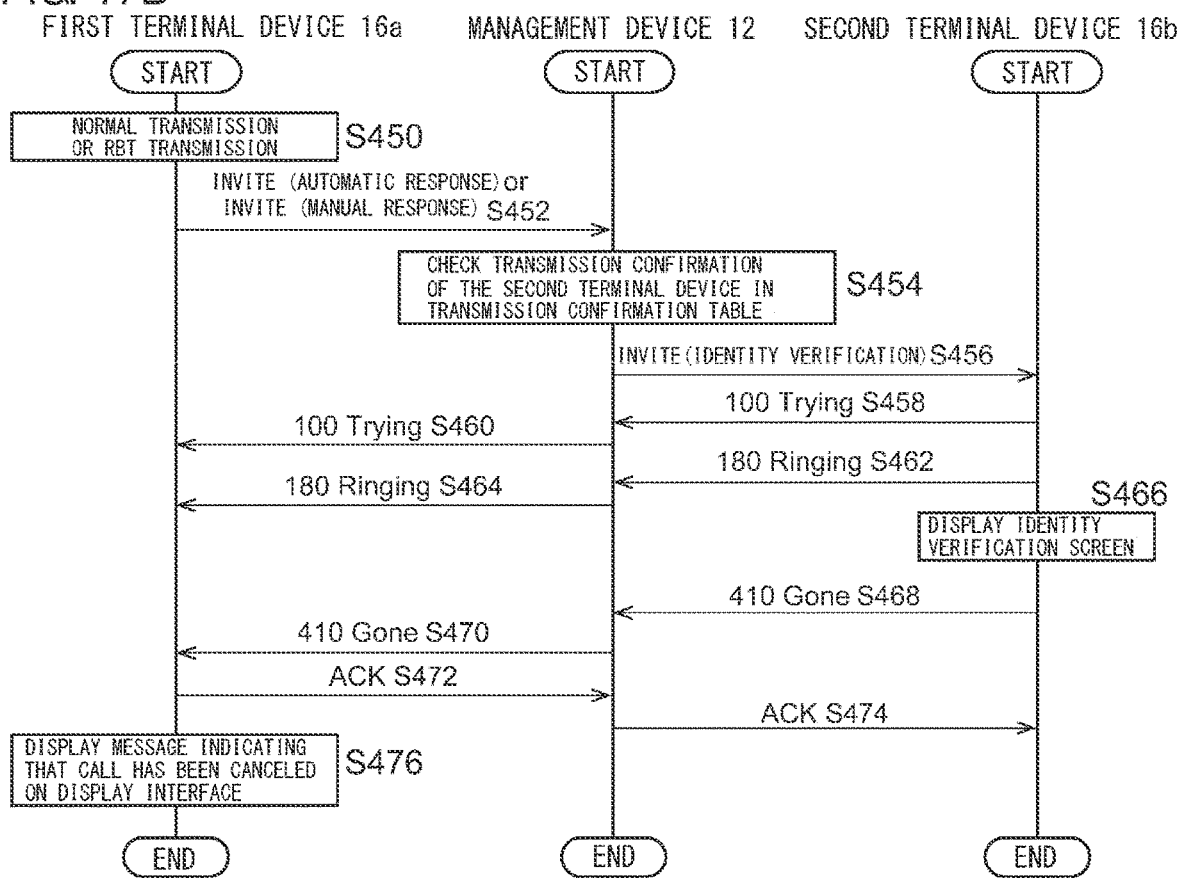

FIGS. 17A to 17B are sequence diagrams showing an SIP sequence accompanied by identity verification in the communication system 100. These are examples of SIP sequences for when transmitting INVITE (identity verification) to the second terminal device 16b when the first terminal device 16a performs the normal transmission or the RBT transmission to the second terminal device 16b in the present exemplary embodiment. In particular, FIG. 17A shows a sequence for when identity verification is performed on the identity verification screen (when identity verification is successful), and FIG. 17B shows a sequence for when no identity verification is performed on the identity verification screen (when identity verification is unsuccessful).

In FIG. 17A, the normal transmission or the RBT transmission is performed in the first terminal device 16a (S400), and the first terminal device 16a transmits INVITE (automatic response) or INVITE (manual response) (S402). The management device 12 checks whether the transmission confirmation of the second terminal device 16b is "0" or "1" in the transmission confirmation table 362 (S404). The sequence in the figure is an example when the transmission confirmation is "1". The management device 12 transmits INVITE (identity verification) (S406). The second terminal device 16b that has received INVITE (identity verification) transmits a status code 100 Trying and a status code 180 Ringing to the first terminal device 16a (S408, S412). The transmitted status code 100 Trying and status code 180 Ringing are transmitted to the first terminal device 16a via the management device 12 (S410, S414). The first terminal device 16a outputs a calling tone and stays on a standby without starting a call.

Figure 18:
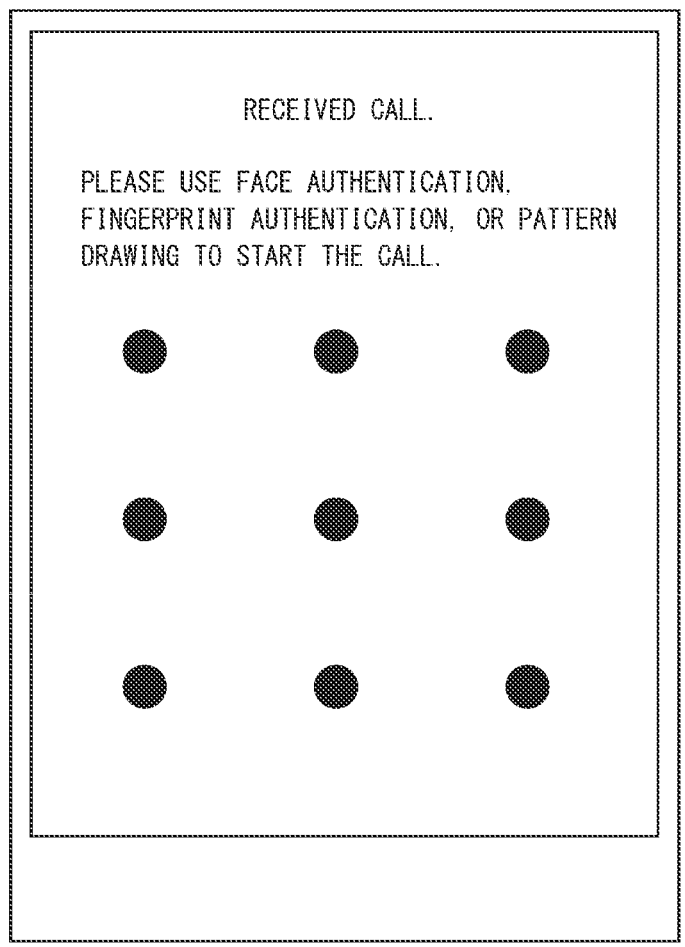
FIG. 18 is a diagram showing a screen displayed on a display of a terminal device.

Next, the controller 38 of the second terminal device 16b displays an identity verification screen on the display interface 36 (S416). FIG. 18 shows a screen displayed on the display interface 36 of the terminal device 16. In this figure, face authentication, fingerprint authentication, and pattern drawing are used as means for performing identity verification as examples. Alternatively, other authentication methods may be used. Further, when this screen is displayed, the controller 38 of the second terminal device 16b may output a ringtone or a notification sound. Further, the housing of the terminal device 16 may be vibrated. FIG. 17A is referred back.

When the user of the second terminal device 16b succeeds in the identity verification, the controller 38 of the second terminal device 16b transmits a status code 200 OK to the first terminal device 16a (S418). After receiving the status code 200 OK from the second terminal device 16b, the controller 338 of the management device 12 sets the transmission confirmation of the second terminal device 16b in the transmission confirmation table 362 to "0" (S420). The management device 12 transmits the status code 200 OK to the first terminal device 16a (S422). After receiving the status code 200 OK, the first terminal device 16a transmits ACK (S424). The transmitted ACK is transmitted to the second terminal device 16b via the management device 12 (S426). After transmitting ACK, the first terminal device 16a starts transmitting call data using RTP (S428, S430, and S432). That is, after S428, the first terminal device 16a and the second terminal device 16b enter a conversation state.

Since steps S450 to S466 in FIG. 17B are the same as steps S400 to S416 in FIG. 17A, description thereof will be omitted here. When the identity verification of the second terminal device 16b is unsuccessful, for example, when information indicating that the user of the second terminal device 16b is an authorized user has not been able to be entered or when no input has been made and a predetermined period of time has passed, the controller 38 of the second terminal device 16b transmits a status code 410 or the like to the first terminal device 16a (S468). The transmitted status code 410 is transmitted to the first terminal device 16a via the management device 12 (S470). After receiving the status code 410, the first terminal device 16a transmits ACK (S472). The transmitted ACK is transmitted to the second terminal device 16b via the management device 12 (S474). When receiving the status code 410 from the management device 12, the controller 38 of the first terminal device 16a displays a message indicating that the call has been canceled on the display interface 36 (S476). The screen is shown, for example, as in FIG. 11.

Figure 19:
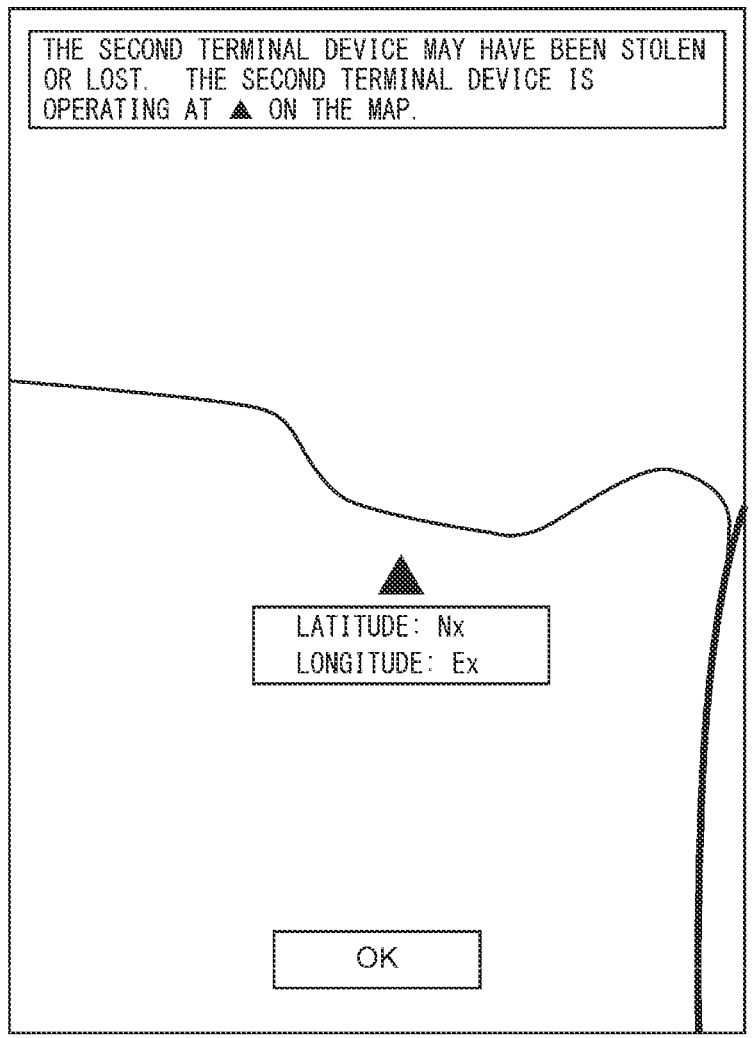
FIG. 19 is a diagram showing a screen displayed on a display of a terminal device.

Further, when the identity verification fails in the second terminal device 16b, the controller 338 of the management device 12 may acquire the current position information on the second terminal device 16b and notify the first terminal device 16a. When the controller 38 of the first terminal device 16a receives the position information on the second terminal device 16b, the controller 38 displays map information on the currently existing position of the second terminal device 16b on the display interface 36. FIG. 19 shows a screen displayed on the display interface 36 of the terminal device 16. The map information is displayed as shown in the figure. In the SIP sequence in FIG. 10 according to the first exemplary embodiment, when the first terminal device 16a displays a message indicating that the call has been canceled on the display interface 36 in S476, map information such as the one shown in FIG. 19 may be displayed. By displaying such map information, the first user 18a of the first terminal device 16a can easily grasp the position of the second terminal device 16b. For example, when the second user 18b using the second terminal device 16b notices that the second terminal device 16b is lost or stolen, the position of the second terminal device 16b can be easily grasped only by making a call to the second terminal device 16b using another first terminal device 16a (for example, the first terminal device 16a used by a friend). Further, in the first terminal device 16a and the second terminal device 16b, since it is not necessary to make settings in advance for displaying map information (lost information) (for example, registration of a terminal device that allows for map display), the burden on the first user 18*a* and the second user 18*b*, that is, the burden on the user is small.

In an example of the sequences shown in FIGS. 17A to 17B, when the transmission confirmation of the second terminal device 16*b* is "0" after INVITE (automatic response or manual response) is transmitted from the first terminal device 16*a* to the second terminal device 16*b*, the management device 12 may immediately transmit INVITE (automatic response) to the second terminal device 16*b*.

As described above, upon receiving a signal addressed to the terminal device 16, the communication interface 334 of the management device 12 transmits the signal to the terminal device 16 if the terminal device 16 is in the first state. On the other hand, upon receiving the signal addressed to the terminal device 16, the communication interface 334 transmits a signal for requesting identity verification to the terminal device 16 when the terminal device 16 is in the second state and controls communication with the terminal device 16 in accordance with the result of the identity verification received from the terminal device 16. In particular, upon receiving a signal in the first communication mode that is addressed to the terminal device 16, the communication interface 334 of the management device 12 transmits the signal in the first communication mode to the terminal device 16 when the terminal device 16 is in the first state. Upon receiving a signal in the first communication mode that is addressed to the terminal device 16, the communication interface 334 transmits a signal in the second communication mode to the terminal device 16 as a signal for requesting identity verification if the terminal device 16 is in the second state. Here, the first communication mode is a communication mode (normal transmission) in which communication is started even when no operation (predetermined operation) is performed in the terminal device 16. Further, the second communication mode is a communication mode in which an operation (predetermined operation) for performing identity verification is performed in the terminal device 16 and communication is started after the identity verification is successful (the user is authenticated). Therefore, the second communication mode in the present exemplary embodiment is often referred to as "RBT transmission with authentication".

According to the present exemplary embodiment, since a call method is automatically switched so as to perform identity verification for a terminal device determined to be highly likely to be being used by a third party who is not an authorized user of a management device, a call does not start unless the identity is verified by an authorized user. Thereby, it is possible to prevent highly confidential call information from being leaked to a third party. Further, when there is a high possibility that an authorized user is using the terminal device, a call is started instantly through the normal transmission. Thus, information can be transmitted quickly. It is also possible to achieve both quick transmission of information and prevention of information leakage.

Although each of the above-described exemplary embodiments has been described using examples in which a terminal device makes a voice call, this example is non-limiting. For example, a terminal device may make a video call (video communication). If the present embodiments are applied to terminal devices that make a video call, the risk for leaking the face image or the like of the user of a terminal device of the transmission source to a third party can be reduced. Further, the present embodiments may be applied to a chat system in which terminal devices exchange messages through text data, image data, or the like. For example, when a terminal device to which a message is transmitted (transmission target) is in the second state, the risk of leaking information to a third party can be reduced by controlling a terminal device of the transmission source in such a manner that a message cannot be entered in the terminal device until an authentication process is completed.

Described above is an explanation on the present invention made based on the exemplary embodiments. These exemplary embodiments are intended to be illustrative only, and it will be obvious to those skilled in the art that various modifications to constituting elements and processes could be developed and that such modifications are also within the scope of the present invention.

What is claimed is:

1. A management device adapted to manage a terminal device, comprising:
   a communication interface that receives position information from a terminal device that is being charged; and
   a controller that determines that the terminal device is in a first state when the position information received in the communication interface is included in a past charging area and determines that the terminal device is in a second state when the position information received in the communication interface is not included in the past charging area, wherein
   upon receiving a signal addressed to the terminal device, the communication interface transmits the signal to the terminal device when the terminal device is in the first state and stops the transmission of the signal to the terminal device when the terminal device is in the second state.

2. The management device according to claim 1, further comprising:
   a storage that stores a charging position table including one or more pieces of position information indicating a past charging position of the terminal device, wherein
   the controller determines that the terminal device is in the first state when there exists position information whose distance from the position information received in the communication interface is a predetermined threshold value or less in the charging position table.

3. The management device according to claim 1, further comprising:
   a storage that stores a charging position table including one or more pieces of position information indicating a past charging position of the terminal device, wherein
   the communication interface transmits a signal for requesting identity verification to the terminal device and then receives the result of the identity verification from the terminal device when position information whose distance from the position information received in the communication interface is a predetermined threshold value or less does not exist in the charging position table, and
   the controller adds the position information received in the communication interface to the charging position table and determines that the terminal device is in the first state when the result of the identity verification is successful.

4. The management device according to claim 1, further comprising:
   a storage that stores a charging position table including one or more pieces of position information indicating a past charging position of the terminal device, wherein the communication interface transmits a signal for requesting identity verification to the terminal device and then receives the result of the identity verification from the terminal device when position information whose distance from the position information received in the communication interface is a predetermined threshold value or less does not exist in the charging position table, and the controller determines that the terminal device is in the second state when the result of the identity verification is unsuccessful.

5. The management device according to claim 1, wherein the communication interface further receives from the terminal device a threshold value that defines the range of a charging area specified by the user of the terminal device, and the controller determines that the position information is included in the past charging area when the distance between the position information and the past charging area is the threshold value or less.

6. A management device adapted to manage a terminal device, comprising:

a communication interface that receives position information from a terminal device that is being charged; and a controller that determines that the terminal device is in a first state when the position information received in the communication interface is included in a past charging area and determines that the terminal device is in a second state when the position information received in the communication interface is not included in the past charging area, wherein upon receiving a signal addressed to the terminal device, the communication interface transmits the signal to the terminal device when the terminal device is in the first state and transmits a signal for requesting identity verification to the terminal device, then receives the result of the identity verification from the terminal device, and controls communication with the terminal device in accordance with the result of the identity verification when the terminal device is in the second state.

7. The management device according to claim 6, further comprising:

a storage that stores a charging position table including one or more pieces of position information indicating a past charging position of the terminal device, wherein the controller determines that the terminal device is in the first state when there exists position information whose distance from the position information received in the communication interface is a predetermined threshold value or less in the charging position table.

8. The management device according to claim 6, further comprising:

a storage that stores a charging position table including one or more pieces of position information indicating a past charging position of the terminal device, wherein the communication interface transmits a signal for requesting identity verification to the terminal device and then receives the result of the identity verification from the terminal device when position information whose distance from the position information received in the communication interface is a predetermined threshold value or less does not exist in the charging position table, and the controller adds the position information received in the communication interface to the charging position table and determines that the terminal device is in the first state when the result of the identity verification is successful.

9. The management device according to claim 6, further comprising:

a storage that stores a charging position table including one or more pieces of position information indicating a past charging position of the terminal device, wherein the communication interface transmits a signal for requesting identity verification to the terminal device and then receives the result of the identity verification from the terminal device when position information whose distance from the position information received in the communication interface is a predetermined threshold value or less does not exist in the charging position table, and the controller determines that the terminal device is in the second state when the result of the identity verification is unsuccessful.

10. The management device according to claim 6, wherein the communication interface performs communication with the terminal device when the result of the identity verification is successful and cancels communication with the terminal device when the result of the identity verification is unsuccessful.

11. The management device according to claim 6, wherein the communication interface cancels communication with the terminal device and transmits the position information received in the communication interface to another terminal device that has transmitted a signal addressed to the terminal device when the result of the identity verification is unsuccessful.

12. The management device according to claim 6, wherein upon receiving a signal in a first communication mode that is addressed to the terminal device, the communication interface transmits the signal in the first communication mode to the terminal device when the terminal device is in the first state and transmits a signal in a second communication mode as a signal for requesting identity verification to the terminal device when the terminal device is in the second state, and the first communication mode is a communication mode in which communication is started even when no operation is performed in the terminal device, and the second communication mode is a communication mode in which an operation for identity verification is performed in the terminal device and communication is started after the identity verification is successful.

13. The management device according to claim 6, wherein the communication interface further receives from the terminal device a threshold value that defines the range of a charging area specified by the user of the terminal device, and the controller determines that the position information is included in the past charging area when the distance between the position information and the past charging area is the threshold value or less.

14. A non-transitory computer readable storage medium encoded with a program comprising modules implemented by a computer adapted to manage a terminal device, the modules including:

receiving position information from a terminal device that is being charged;

determining that the terminal device is in a first state when the received position information is included in a past charging area and determining that the terminal device is in a second state when the received position information is not included in the past charging area;

upon receiving a signal addressed to the terminal device, transmitting the signal to the terminal device when the terminal device is in the first state; and upon receiving a signal addressed to the terminal device, transmitting a signal for requesting identity verification to the terminal device, then receiving the result of the identity verification from the terminal device, and controlling communication with the terminal device in accordance with the result of the identity verification when the terminal device is in the second state.

* * * * *